United States Patent
Zelko

(10) Patent No.: US 6,708,836 B2
(45) Date of Patent: Mar. 23, 2004

(54) CONTAINER CONSISTING OF A PLURALITY OF PLATES

(75) Inventor: Johannes Zelko, Pettenbach (AT)

(73) Assignee: Steiner Technology GmbH, Ebensee (AT)

( * ) Notice: Subject to any disclaimer, the term of this patent is extended or adjusted under 35 U.S.C. 154(b) by 196 days.

(21) Appl. No.: 09/861,342

(22) Filed: May 21, 2001

(65) Prior Publication Data

US 2002/0108951 A1 Aug. 15, 2002

Related U.S. Application Data

(63) Continuation of application No. PCT/AT99/00267, filed on Nov. 5, 1999.

(51) Int. Cl.$^7$ .................................. B65D 6/12
(52) U.S. Cl. .............................................. 220/7
(58) Field of Search .................................. 220/6, 7

(56) References Cited

U.S. PATENT DOCUMENTS

| | | | |
|---|---|---|---|
| 4,751,773 A | 6/1988 | Nysten | |
| 4,960,223 A | 10/1990 | Chiang et al. | |
| 5,330,067 A | 7/1994 | Gronnevik | |
| 5,398,834 A | 3/1995 | Umiker | |
| 5,454,821 A | 10/1995 | Harm et al. | |
| 5,515,987 A | * 5/1996 | Jacques et al. | 220/6 |
| 5,588,549 A | 12/1996 | Furtner | |
| 5,706,555 A | 1/1998 | Furtner | |
| 5,722,550 A | 3/1998 | Ficker | |
| 5,829,617 A | * 11/1998 | Umiker | 220/6 |
| 5,975,324 A | 11/1999 | Schmitt | |
| 6,209,742 B1 | * 4/2001 | Overholt et al. | 220/7 X |
| 6,286,701 B1 | * 9/2001 | Umiker | 220/7 X |

FOREIGN PATENT DOCUMENTS

| | | |
|---|---|---|
| AT | 000 665 U1 | 3/1996 |
| CH | 682 208 | 7/1994 |
| DE | 1 586 980 | 9/1970 |
| DE | 297 10 794 U | 11/1997 |
| EP | 1 502 126 | 2/1978 |
| EP | 1 586 980 | 1/1979 |
| EP | 0 602 575 | 6/1994 |
| EP | 682 208 | 7/1994 |
| EP | 773 171 | 9/1996 |
| EP | 0 759 400 A2 | 2/1997 |
| EP | 773 171 | 5/1997 |
| EP | 297 10 794 | 11/1997 |
| GB | 1 502 126 | 2/1978 |
| HU | 204 222 | 12/1991 |
| WO | WO 94/11259 | 10/1993 |
| WO | WO 95/13970 | 11/1994 |
| WO | WO 96/11144 | 10/1995 |
| WO | WO 97/41037 | 4/1997 |
| WO | WO 98/34838 | 2/1998 |
| WO | WO 00/29294 | 11/1999 |

* cited by examiner

*Primary Examiner*—Joseph M. Moy
(74) *Attorney, Agent, or Firm*—Alston & Bird LLP

(57) ABSTRACT

The invention describes a container comprising a plurality of flaps, several of the flaps being adjustably joined in the region of their front edges by means of hinge mechanisms with the flap forming the base and at least one hinge pin extending parallel with a front edge of a flap is retained at a distance therefrom by means of a connecting link and is insertable in a groove of another flap and one of the two end regions of the groove is closed off across its width by a retaining shoulder and forms a housing chamber for one of the two end regions of the hinge pin, the groove being arranged at least in part regions in a peripheral ridge projecting above one of the flaps and having an open length which corresponds to at least the length of the hinge pin.

64 Claims, 17 Drawing Sheets

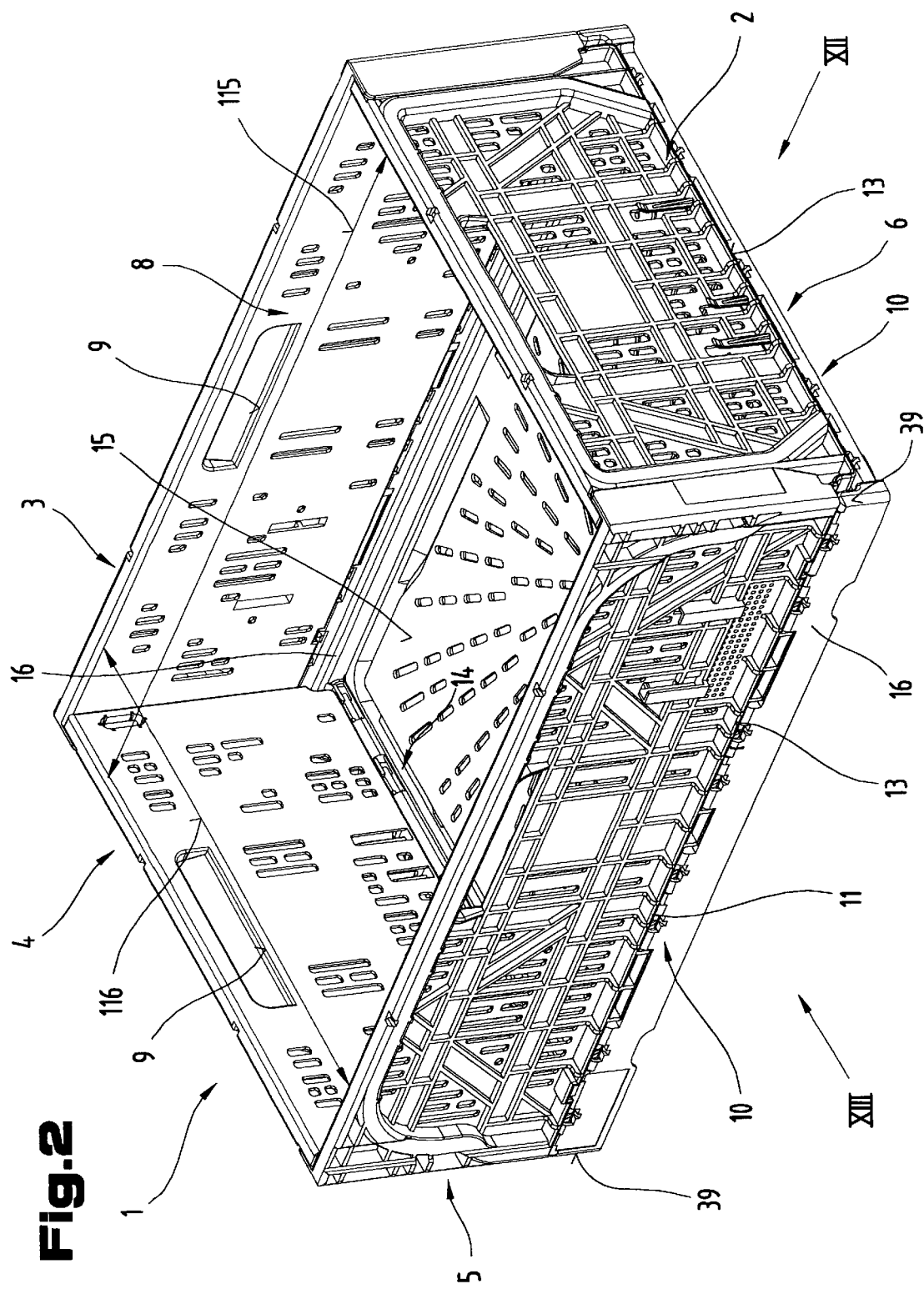

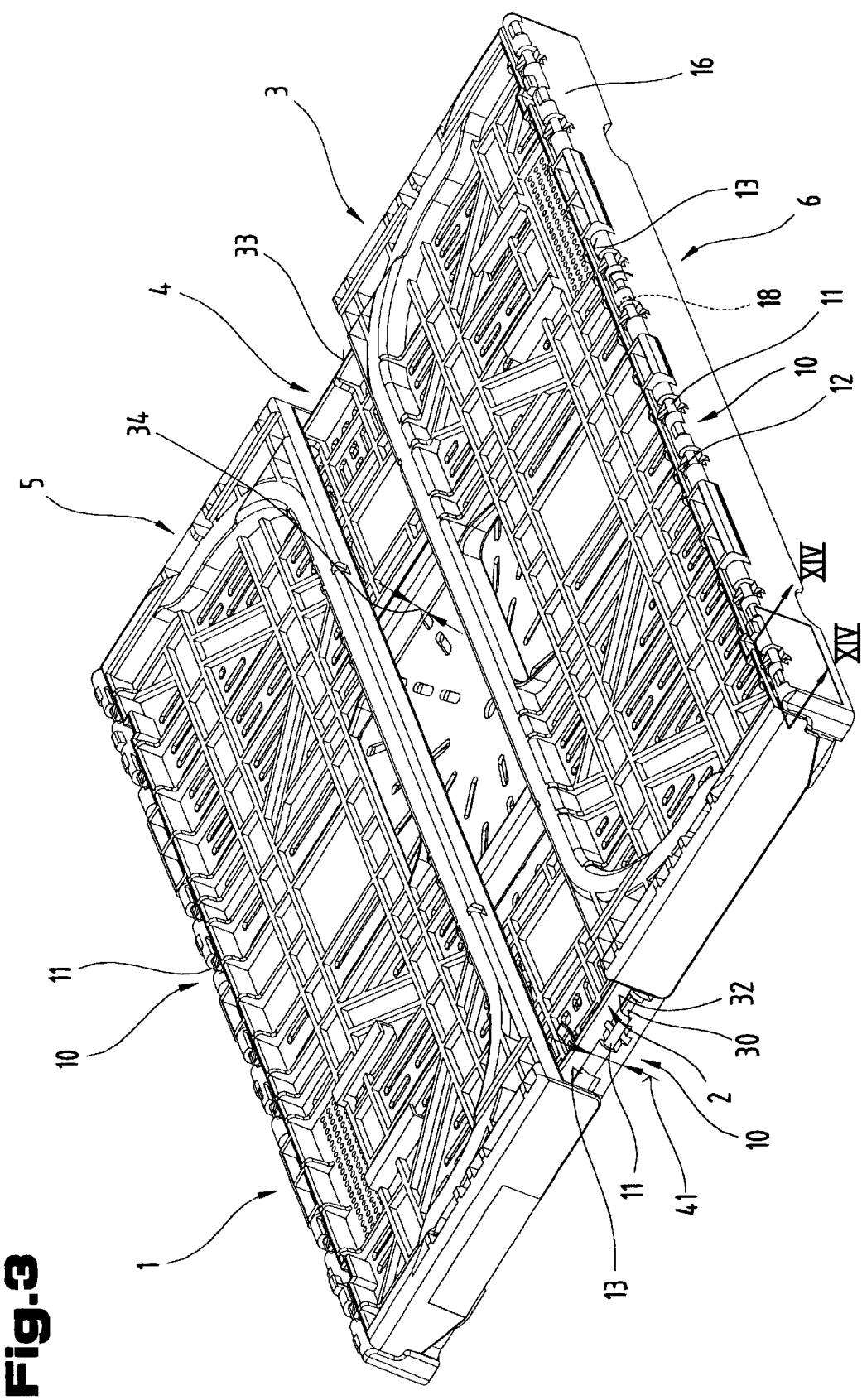

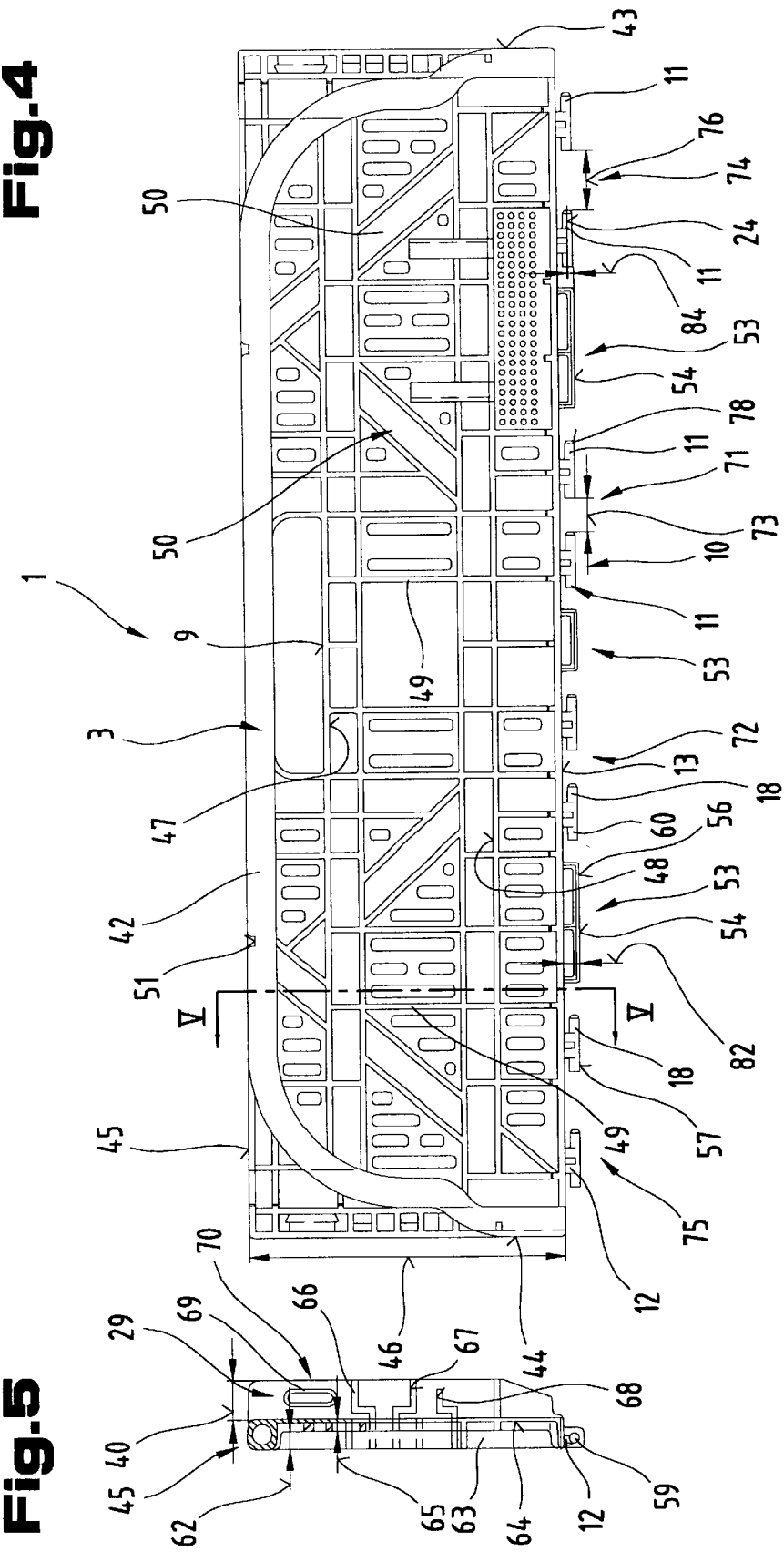

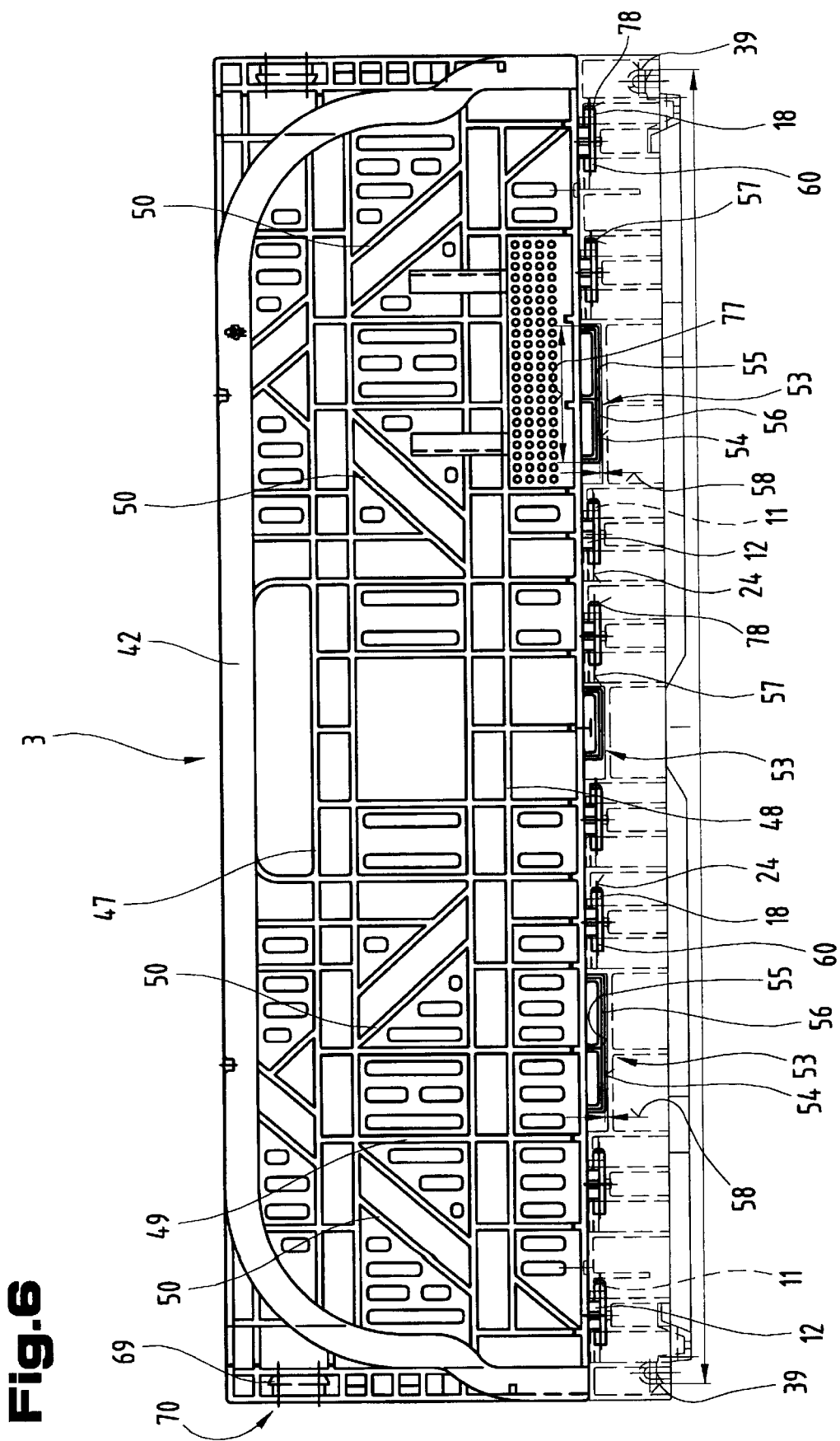

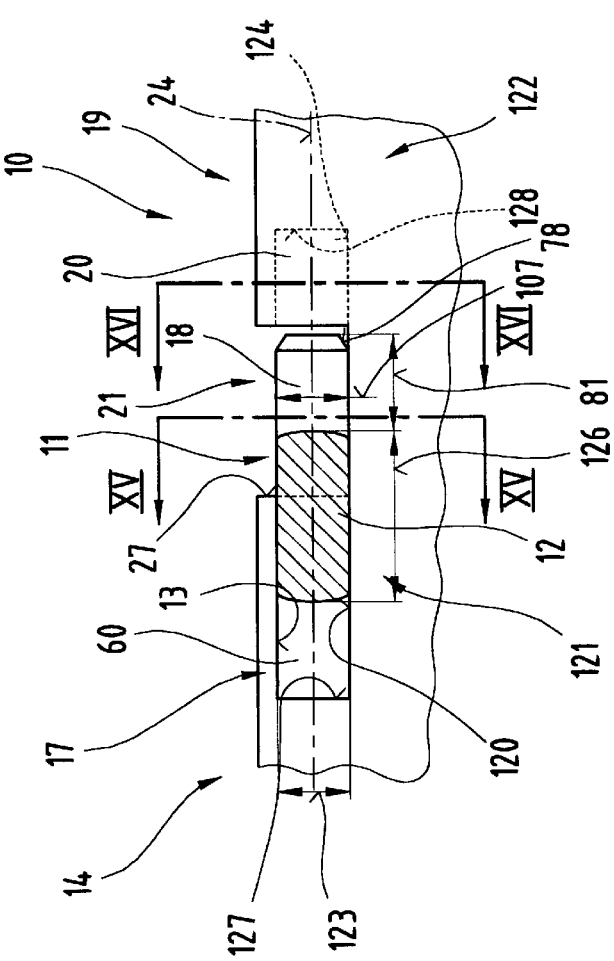

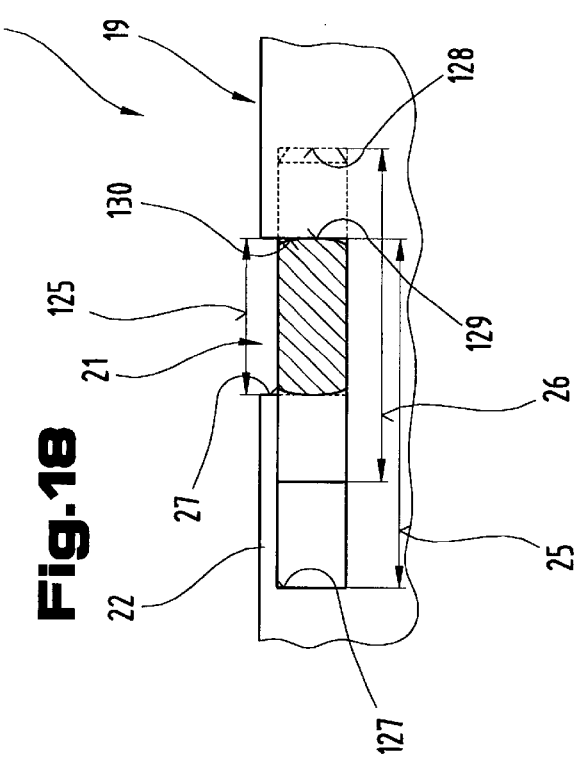
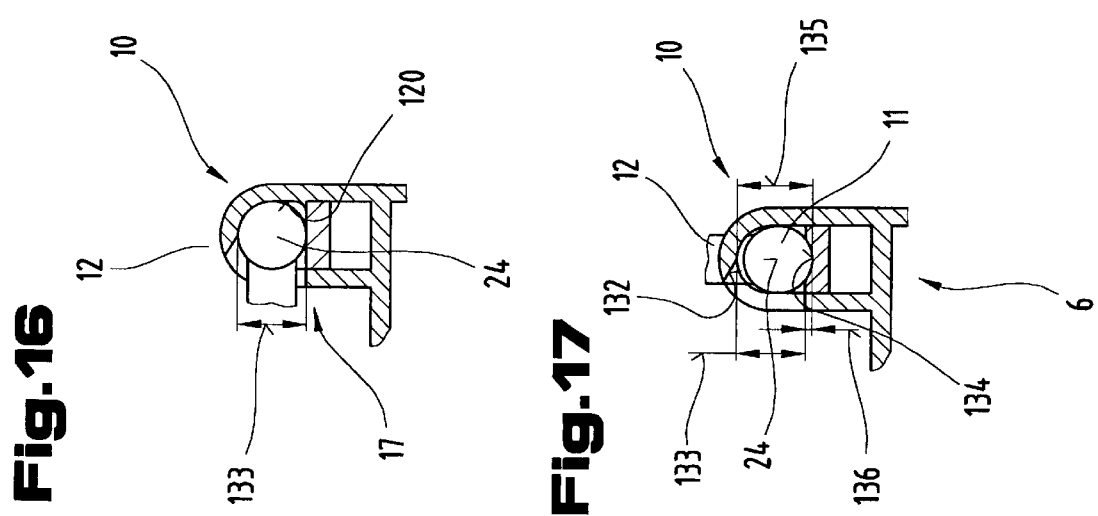

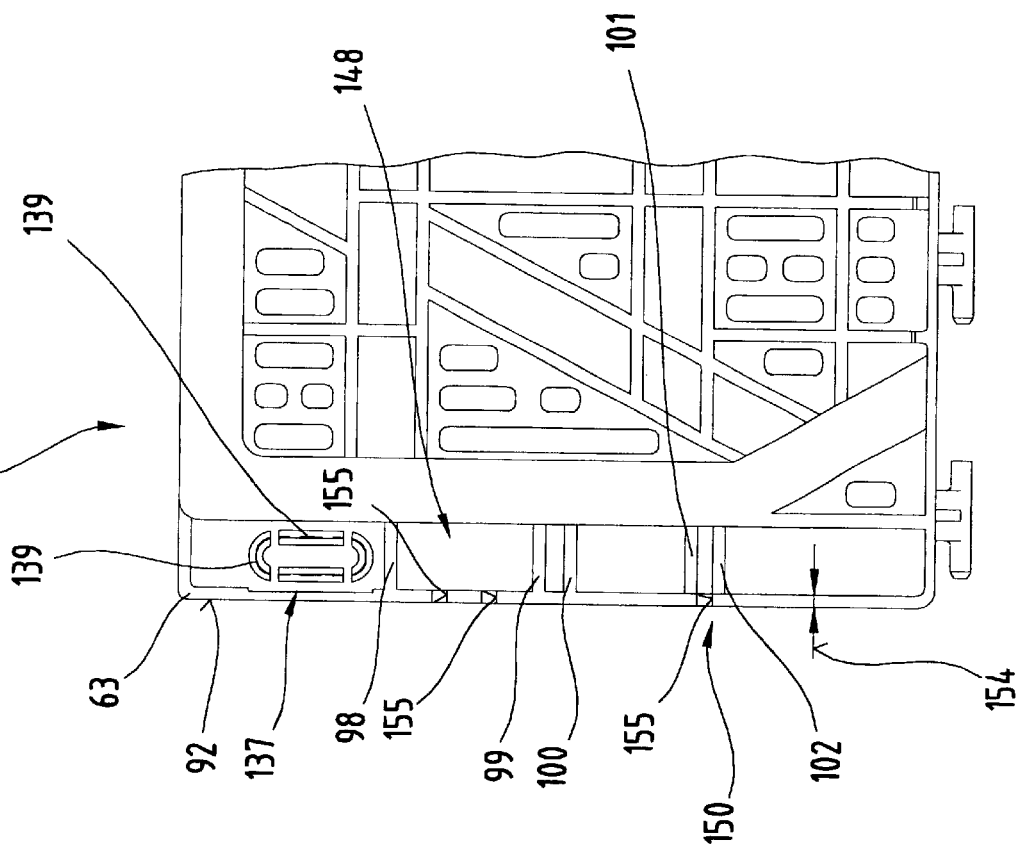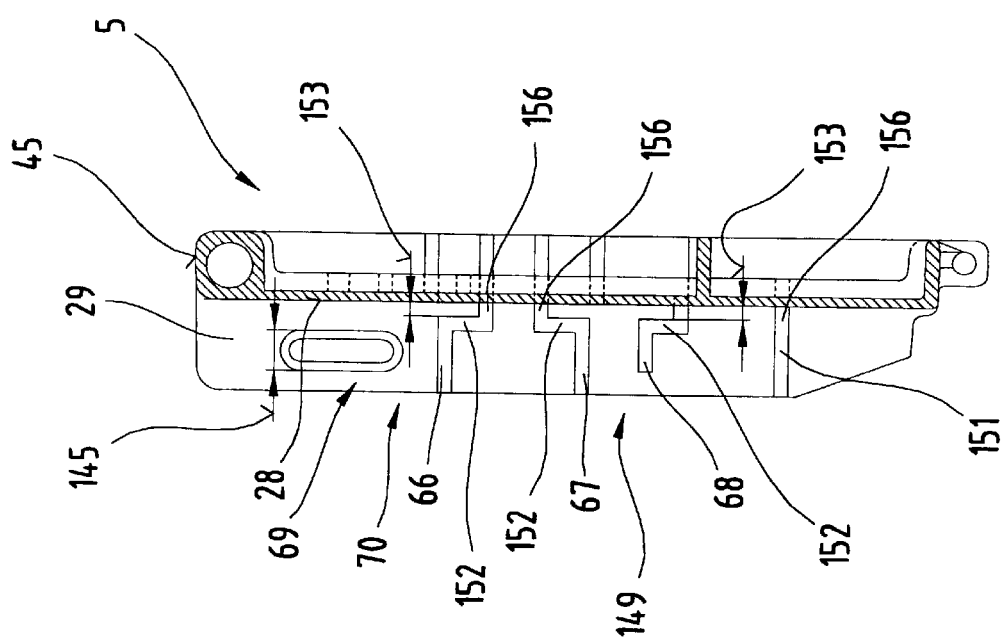

CONTAINER CONSISTING OF A PLURALITY OF PLATES

CROSS-REFERENCE TO RELATED APPLICATIONS

This application is a continuation of pending PCT International Application PCT/AT99/00267, filed Nov. 5, 1999, designating inter alia the United States.

FIELD OF THE INVENTION

The invention relates to a container formed of hingedly connected plates such that the container is collapsible.

BACKGROUND OF THE INVENTION

Amongst other documents, containers of this type are known from WO 94/11259 A, WO 95/13970 A and WO 97/41037 A, filed by the predecessor of the present applicant. Containers of this type consist of several flaps, one of which forms the base whilst the others form side walls, and the flaps can be folded into a position in which they are parallel with one another for the purposes of cleaning or for transporting empty, in which case they are folded into a position parallel with the base, either extending out beyond it or inwards so that they lie on the base.

In order to transport goods, the flaps forming the side walls are swung upwards into a position perpendicular to the base and secured to one another.

The devices allowing the individual flaps to be pivoted are provided in the form of hinge pins, which are retained at a distance from the front edges of the individual flaps by means of connecting links and which locate in grooves of the other flap. In some of these containers, the flaps can be separated from one another by displacing the individual flaps relative to one another in a direction of the longitudinal axis of the hinge pins.

A container is also known from WO 96/11144 A1 and from DE 42 01 145 A1 and is of a design similar to those described above. With these containers, the first of the above-mentioned publications proposes a design in which one of the guide sleeves for the hinge pin has slits and is elastically deformable in a radial direction allowing a pivoting action to reach and lock into the position relative to the flap forming the base, whilst the rest of the hinge mechanism is designed so that when the flaps forming the side walls are in the upright position the hinge pin is relieved of vertical stress, i.e. stress applied in a direction perpendicular to the flap forming the base is deflected.

However, all the containers described above have proved incapable of meeting all the requirements placed on them in terms of strength and the securing elements have not proven sufficiently capable of taking the strain.

Accordingly, the objective of the present invention is to provide a container which is capable of exhibiting a high degree of resistance to the increased strain placed on them when transporting goods, as well as the stress applied to the containers from outside, and which is capable of taking the weight of the containers above when stacked one on top of the other.

SUMMARY OF THE INVENTION

The above needs are addressed and other advantages are achieved by a container in accordance with the present invention. In one preferred embodiment of the invention, the container comprises a base and a plurality of flaps, each of the flaps being hingedly connected at a front edge thereof to the base by at least one hinge mechanism. Each hinge mechanism comprises at least one hinge pin affixed to the corresponding flap and a groove formed in the base for receiving the hinge pin, the hinge pin extending parallel to the front edge of the flap and being affixed to the front edge by a connecting link that extends therebetween such that the hinge pin is spaced at a distance from the front edge. The groove is formed in a peripheral ridge that projects above a surface of the base, the groove extending along a longitudinal axis thereof and having an opening extending laterally thereinto through which the hinge pin can be inserted into the groove. The groove has an end region forming a housing chamber for an end region of the hinge pin, the end region of the hinge pin having a length projecting beyond the connecting link in the direction of the longitudinal axis of the groove. The housing chamber is defined by a retaining shoulder preventing the hinge pin from being laterally withdrawn from the groove. The peripheral ridge defines a recess therein so as to provide a region for the connecting link of the hinge pin to pivot about the longitudinal axis of the groove, the recess for the connecting link being delimited in the direction of the longitudinal axis by the retaining shoulder and a stop. A distance between the retaining shoulder and the stop is at least as great as a length of the connecting link in a direction parallel to the hinge pin but not greater than a sum of the length of the connecting link and the length of the end region of the hinge pin. Accordingly, the container is advantageous due to fact that the layout of peripheral ridges increases the strength of the flap forming the base and due to the fact that the linking devices are mounted above the surface of the base so that the flaps forming the side walls can be positioned and released from the base in a horizontally restricted position on the base, whilst, in the erected state, the hinge pins can be arranged so that they are protected and covered towards the exterior. Consequently, these delicate and sensitive hinge pins of the hinge arrangements are better protected, for example against the prongs of fork lifts or from being too tightly packed together or from impact against the side wall of a vehicle.

A further embodiment of the invention has an advantage in that the hinge pin is pretensed by a minimum degree relative to the bearing regions in which it is mounted in the groove in order to provide additional space so that, even when subjected to stress caused by impact and vibrations, the hinge pin is still adequately guided and retained in the groove. At the same time, however, any undesirable excessive strain on the hinge pins which might cause them to break or bend can be safely avoided. This enables a higher vertical load to be applied, even when the containers are stacked one on top of the other, and ensures that the hinge pins will be more efficiently retained in the grooves in the event of impact from the outside acting on the flaps forming the side walls and affecting the interior of the container.

Another embodiment provides a surprisingly advantageous design whereby the flaps, which can be adjusted relative to one another, are folded together in the upright position and located, the arrangement of connecting seats having elastically deformable retaining elements designed to provide guidance and support in different spatial directions, thereby advantageously preventing any bowing in the corner region where the flaps are joined to one another. The solution outlined in claim 4, which offers a solution in its own right, allows the upright flaps bearing one against the other to be interlocked in flaps arranged approximately perpendicular to the flaps forming the base in different spatial directions so that even in the event of high vertical or horizontal loads, the flaps abutting with one another will be prevented from weakening in different spatial directions and no damage or similar is caused to the container even when subjected to extreme stress by the goods contained therein or by externally acting forces applied by conveyor means.

Other advantageous embodiments are described in the following detailed description.

BRIEF DESCRIPTION OF THE DRAWINGS

Having thus described the invention in general terms, reference will now be made to the accompanying drawings, which are not necessarily drawn to scale, and wherein:

The invention will be described in more detail with reference to the drawings which give examples of different embodiments.

Figure 1:
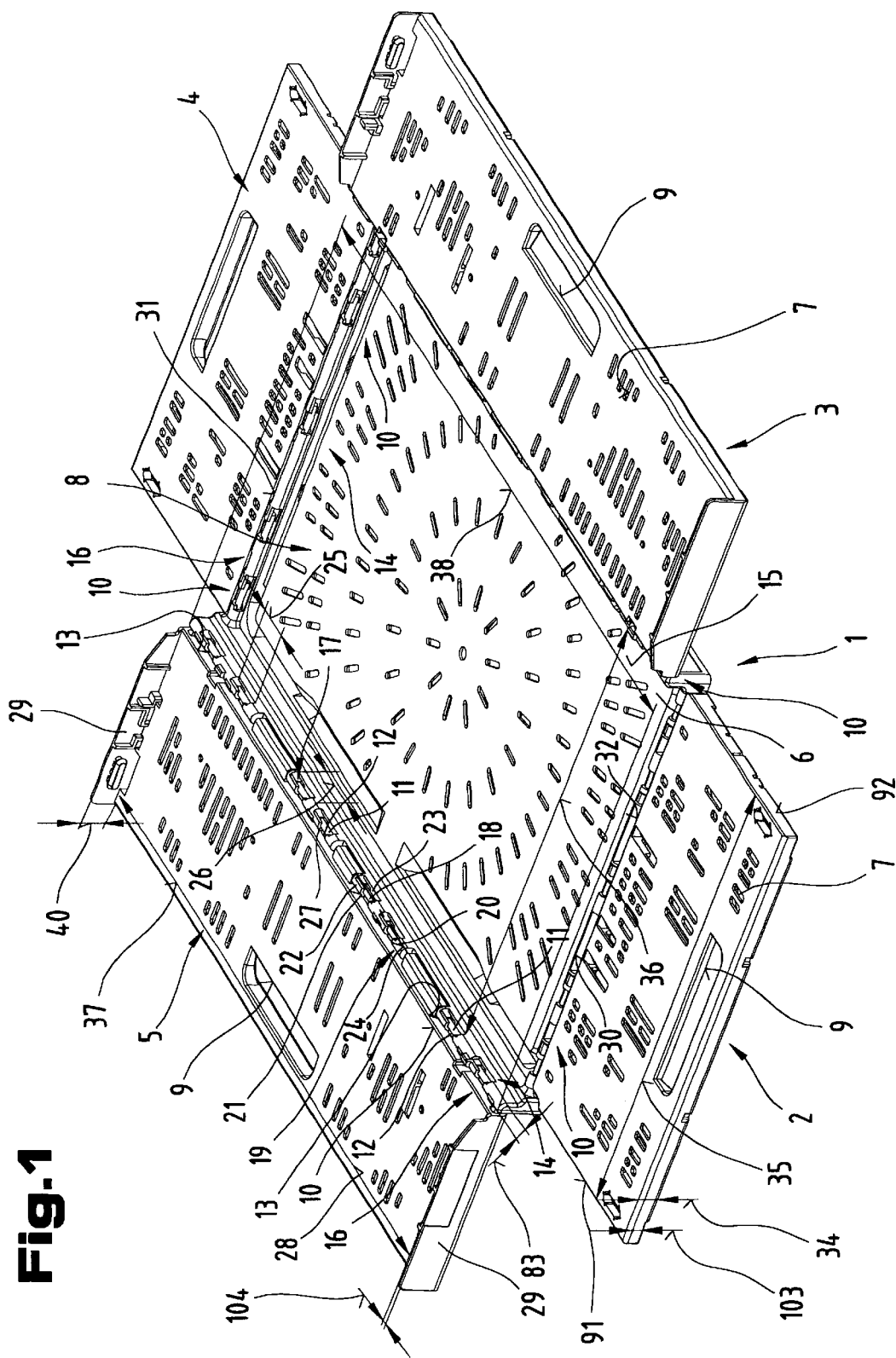
Figure 7:
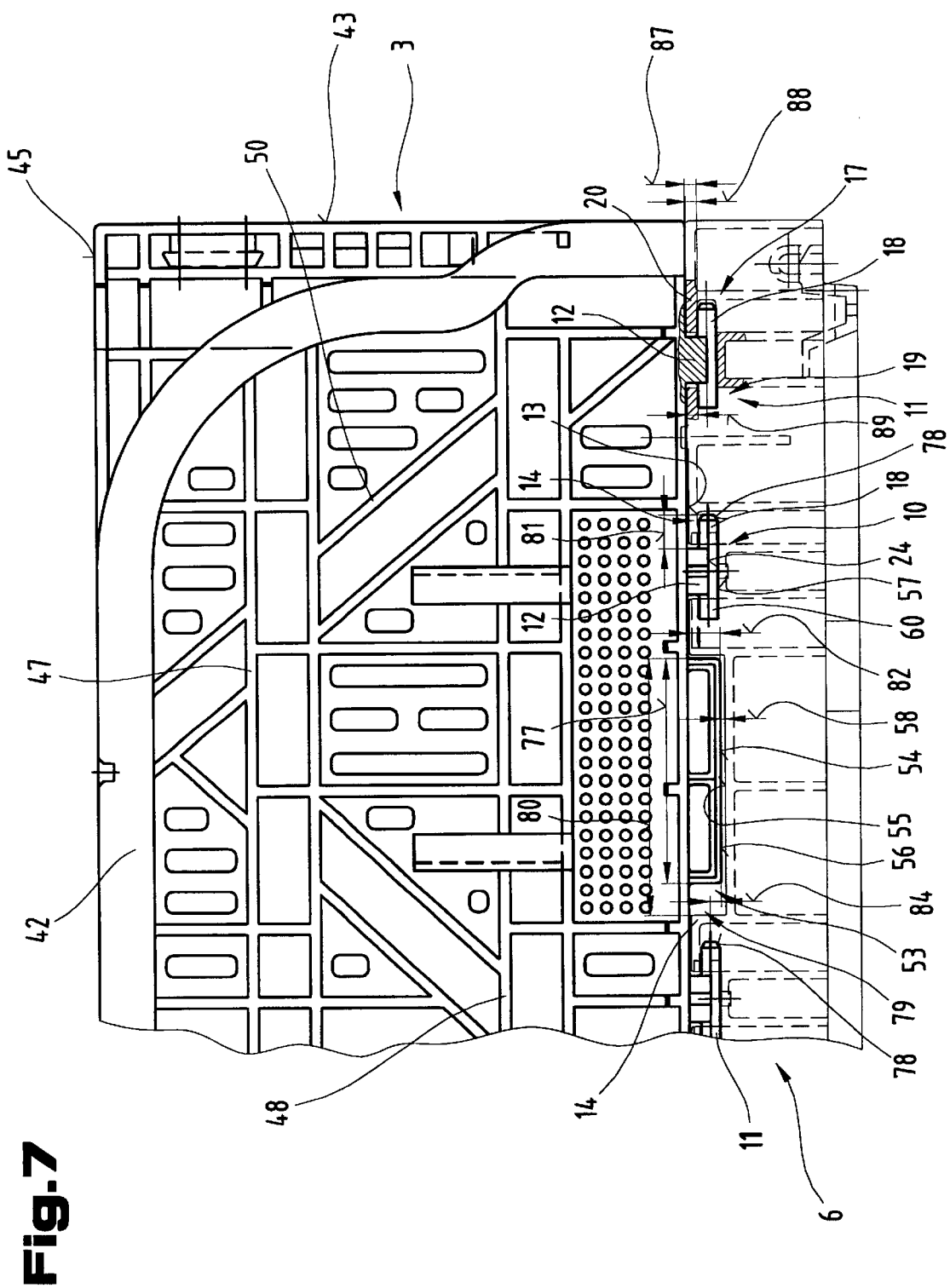
Figure 8:
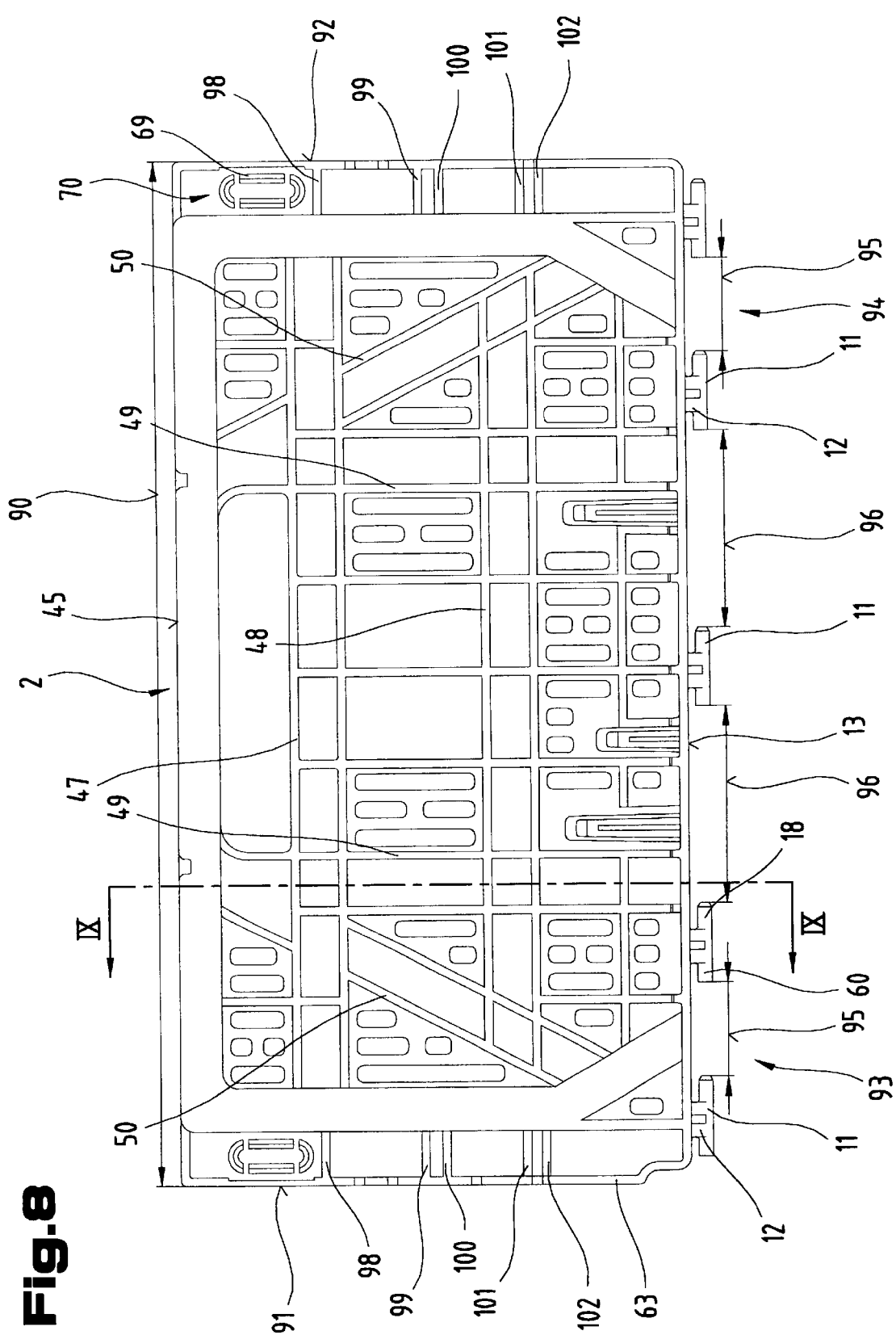
Figure 9:
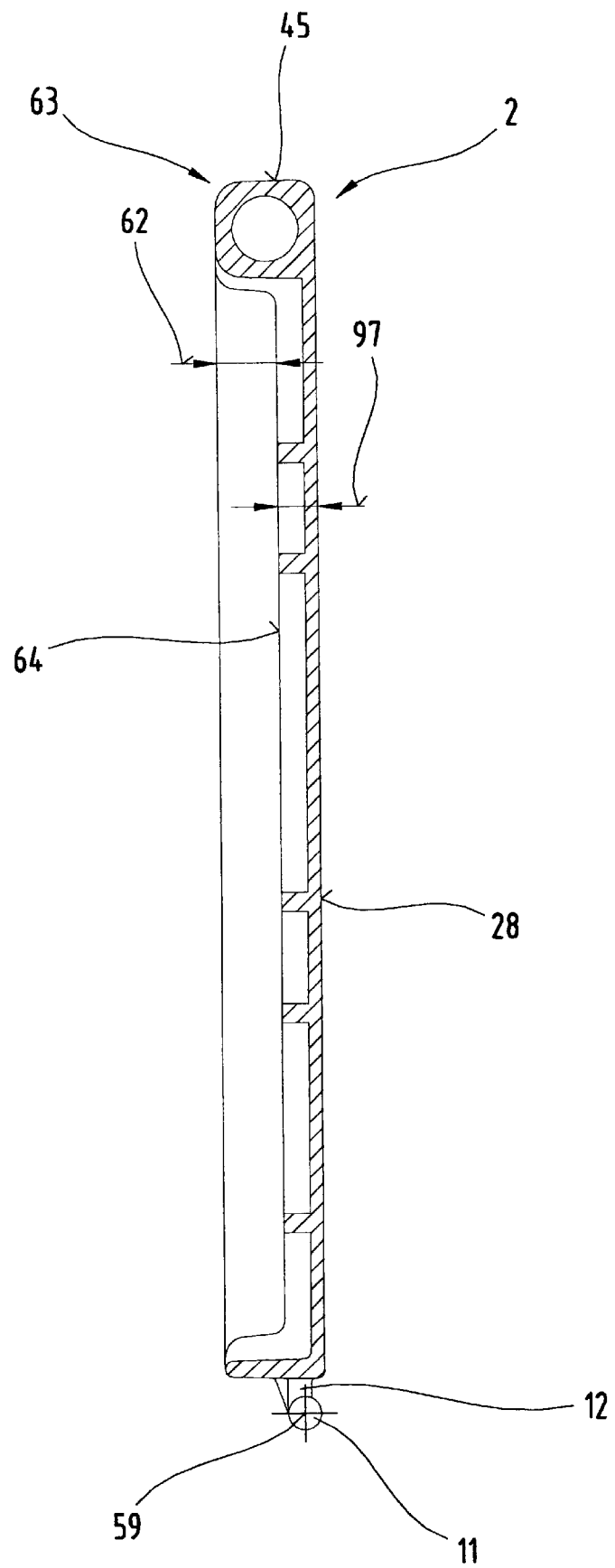
Figure 10:
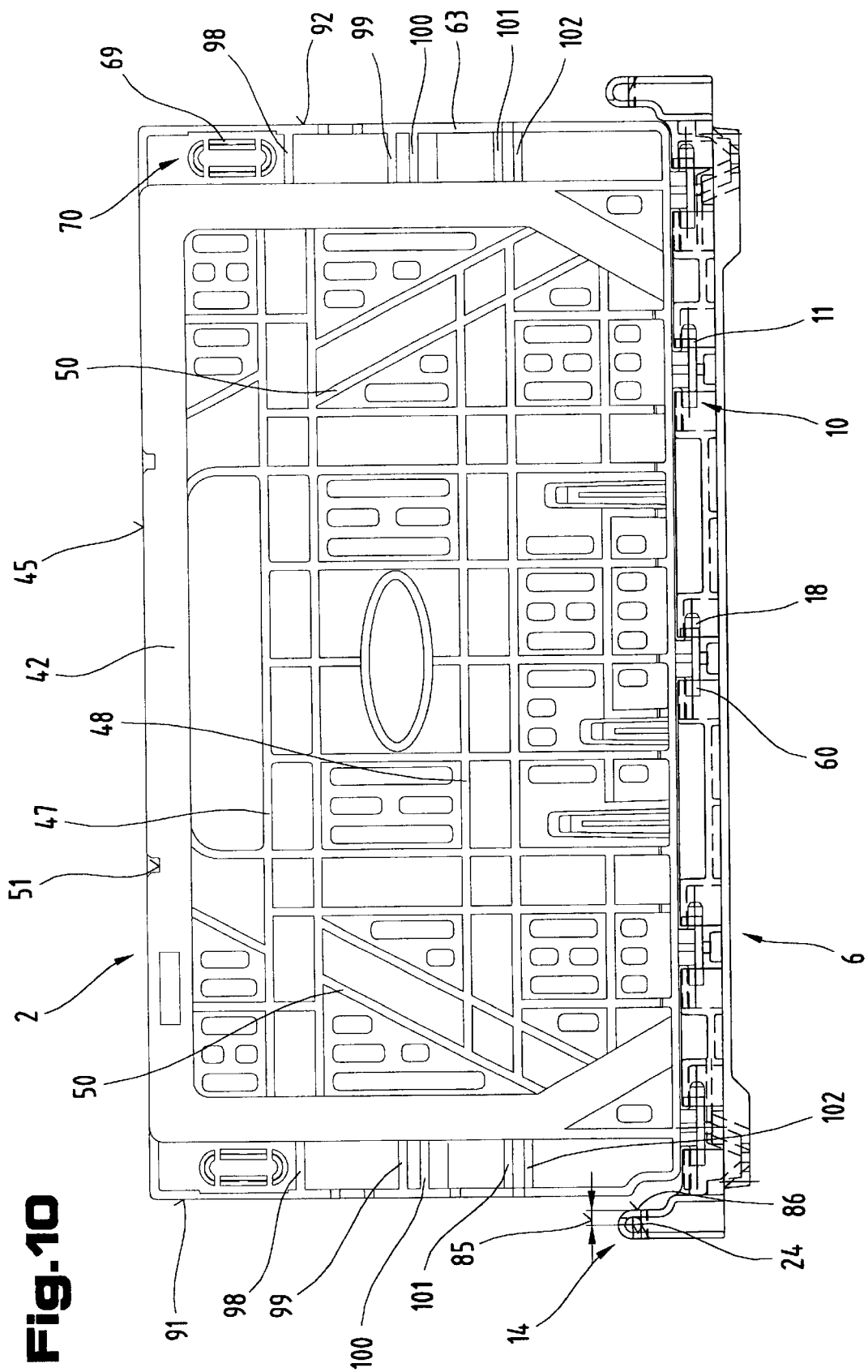
Figure 11:
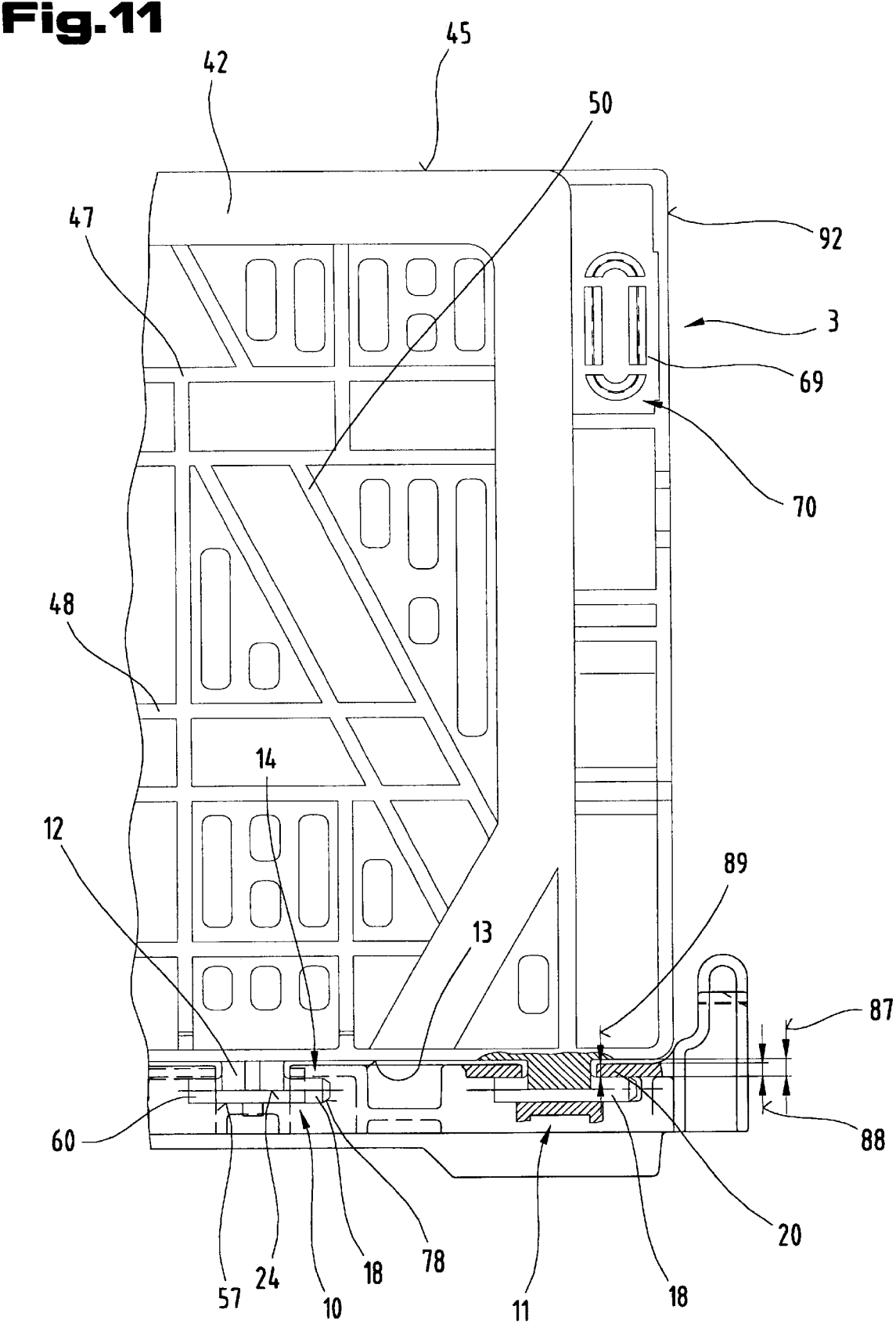
Figure 12:
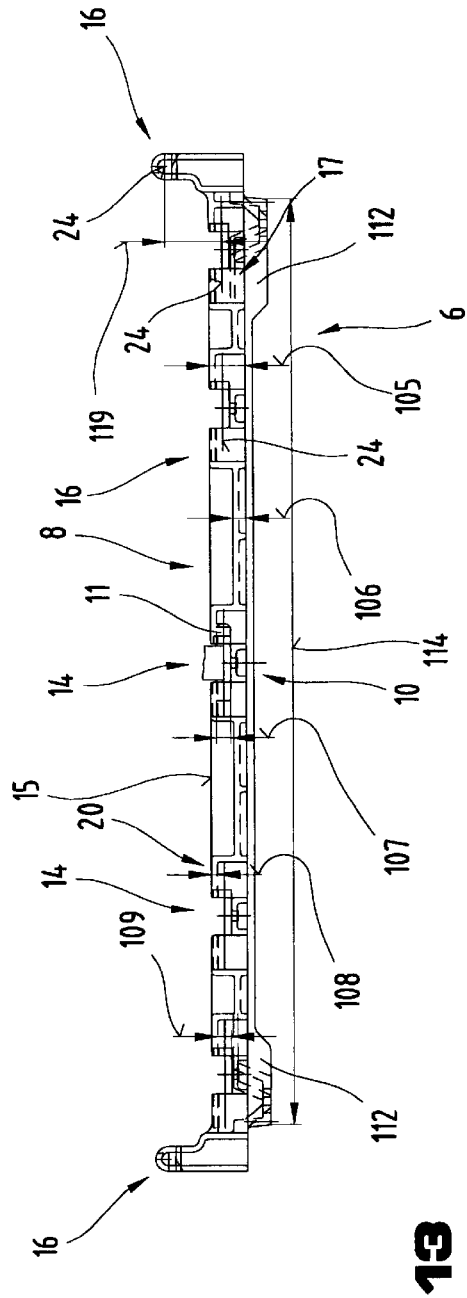
Figure 13:
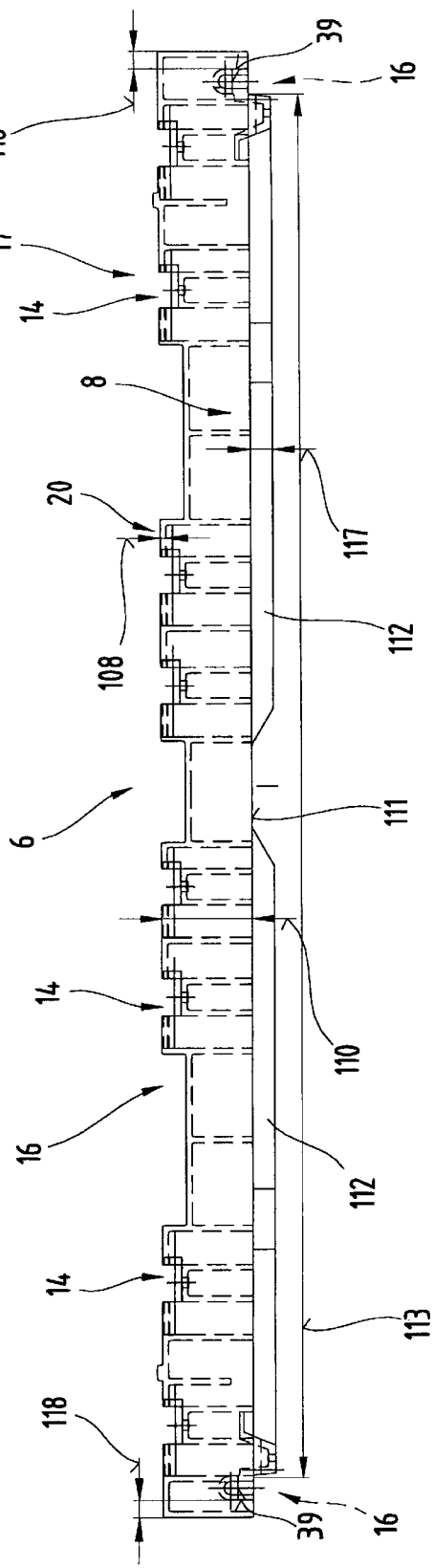
Figure 22:
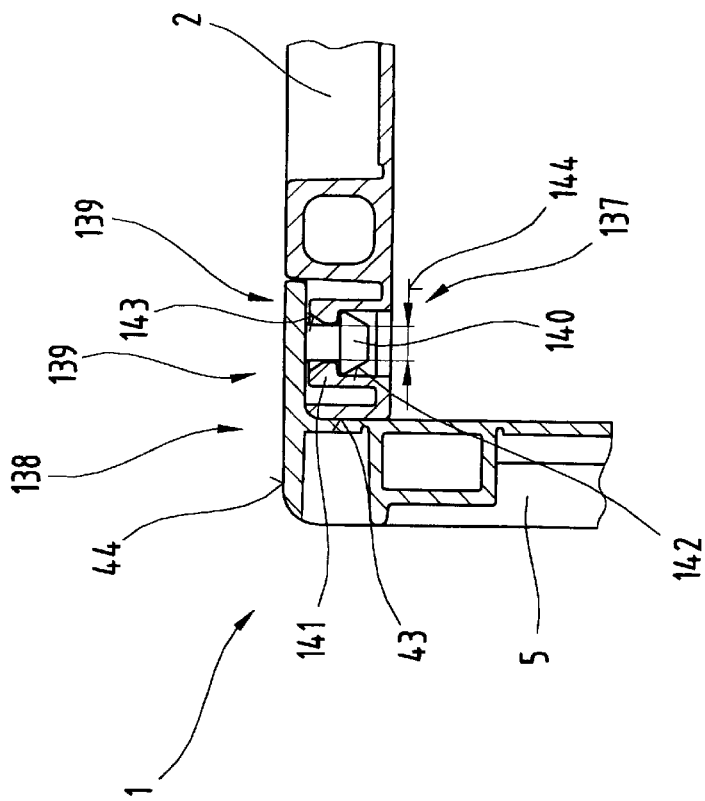
Figure 21:
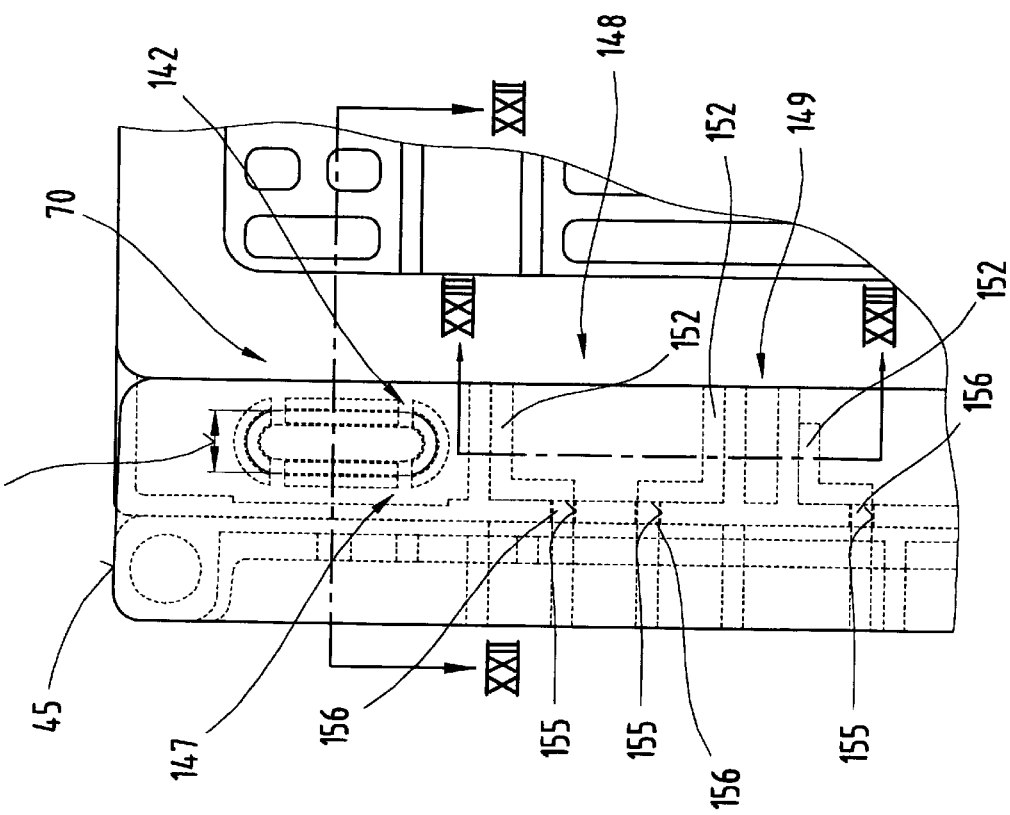
Figure 23:
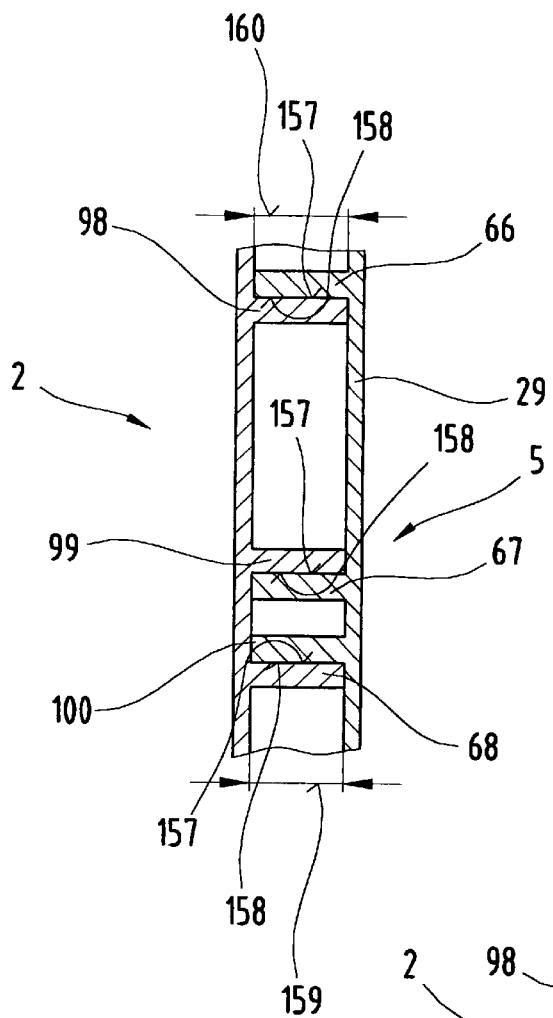
Figure 24:
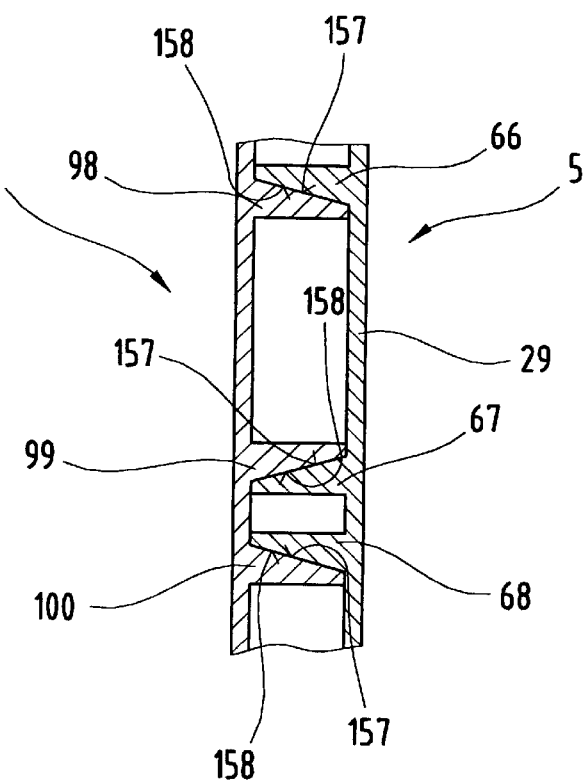
Figure 25:
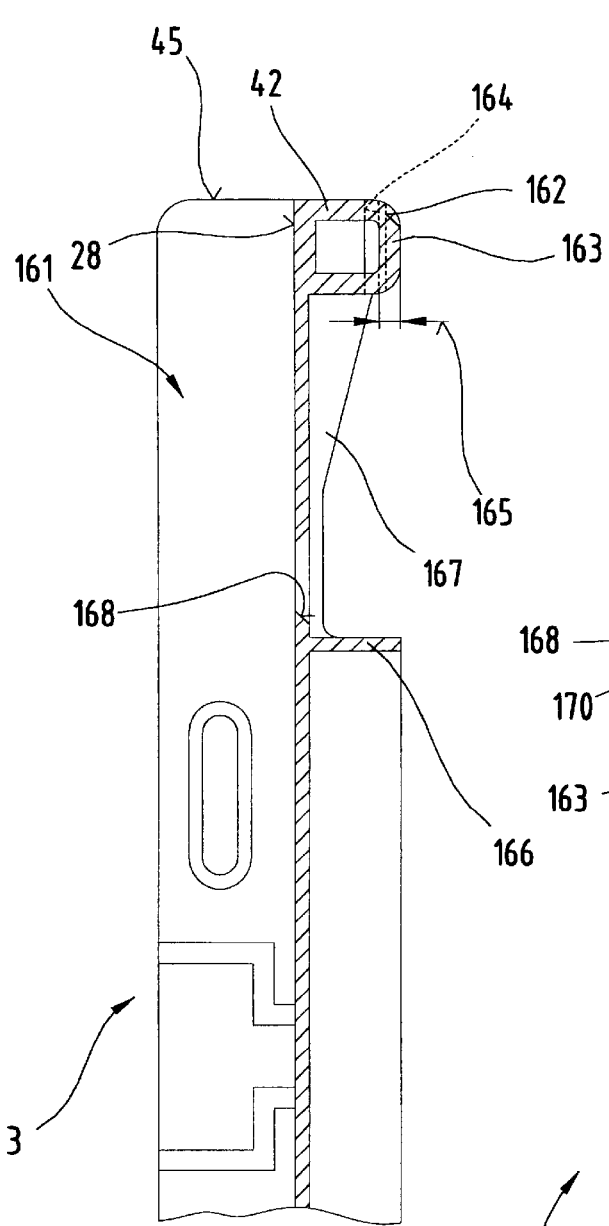
Figure 26:
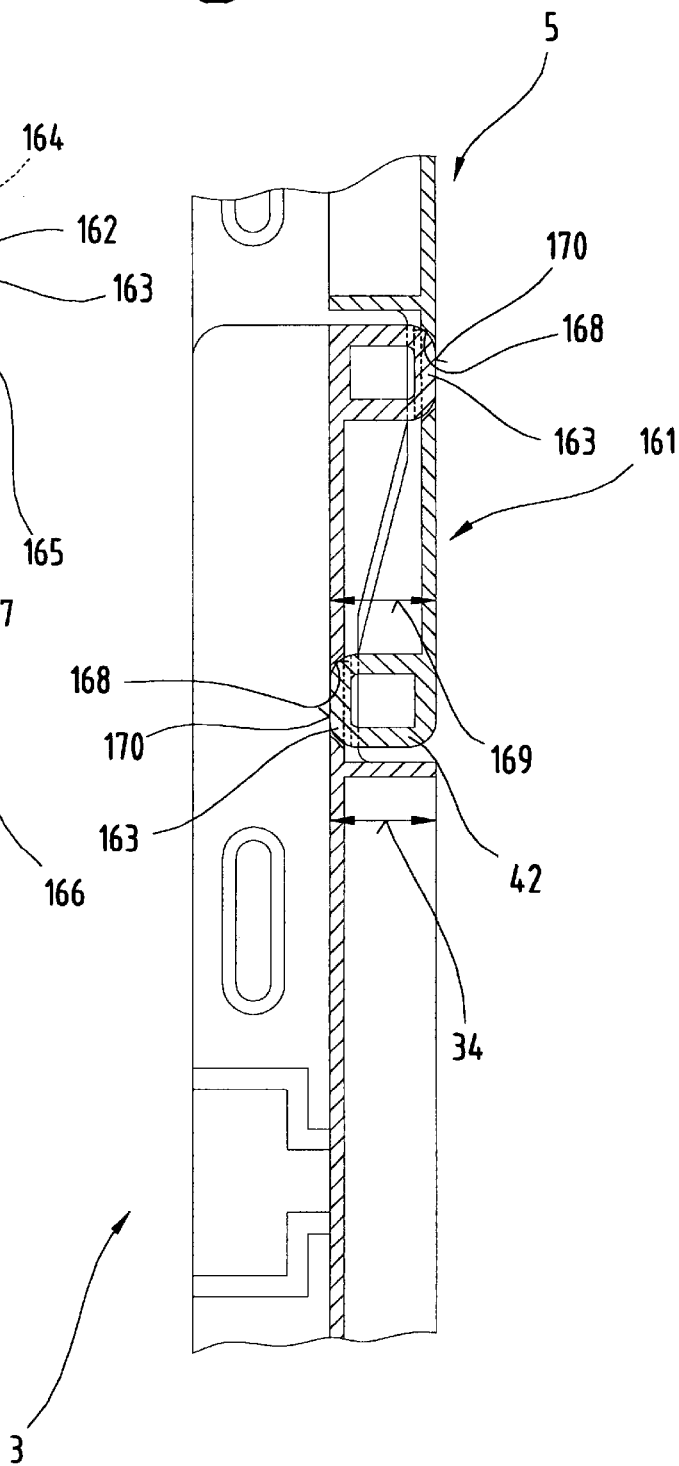

Of these:

FIG. 1 is simplified schematic illustration, from an oblique viewpoint, of a container proposed by the invention where the flaps forming the base and side walls are arranged in a position parallel with one another;

FIG. 2 is a perspective view of the container illustrated in FIG. 1 where the flaps forming the side walls are folded upright in the ready-to-use position;

FIG. 3 shows a container proposed by the invention in a different transportation position where the flaps forming the side walls are folded inwards, down onto the flap forming the base;

FIG. 4 is a side view of a flap forming a side wall of the container proposed by the invention;

FIG. 5 shows a front-face end part of the flap seen from a front view along the line V—V of FIG. 4;

FIG. 6 shows a side view of the flap forming the side wall, folded up into its ready-to-use position at an angle of 90° to the flap forming the base;

FIG. 7 is a part of the flap forming the side wall in a front end region thereof, illustrated on a larger scale and from a side view;

FIG. 8 shows a flap forming an end wall of the container, seen from a side view;

FIG. 9 shows the flap forming the end wall in a side view along the line IX–XI of FIG. 8;

FIG. 10 shows a side view of the flap forming the end wall in its position folded up by 90° relative to the flap forming the base, with the flaps forming the longitudinal side walls removed;

FIG. 11 is an end-region of the flap forming an end wall of the container on a larger scale;

FIG. 12 shows the flap forming the base from a front end view and with the flaps forming the side walls removed, along the arrow XII shown in FIG. 2;

FIG. 13 shows the flap forming the base in a side view along arrow XIII of FIG. 2;

FIG. 14 is a side view of a hinge bearing of a container proposed by the invention between a flap forming a base and a flap forming a side wall, with the hinge pin inserted therein, seen along the line XIV—XIV of FIG. 3;

FIG. 15 shows the hinge bearing from a front view along the arrow XV—XV of FIG. 14;

FIG. 16 shows the hinge bearing between two flaps in a front view along line XVI—XVI of FIG. 14;

FIG. 17 is a different embodiment of the design used for the hinge bearing, seen in a front view similar to that of FIG. 16;

FIG. 18 is a side view onto a hinge bearing of a container proposed by the invention, between a flap forming a base and a flap forming a side wall, in a side view the same as that of FIG. 14, with the end region of the hinge pin inserted in the retaining shoulder;

FIG. 19 shows a front-face end part of the flap from a side view;

FIG. 20 is a part region of another flap from the same side view;

FIG. 21 shows the corner region between two upright flaps standing perpendicular to a flap forming the base, in the ready-to-use position;

FIG. 22 shows the corner region of FIG. 21 along the line XXII—XXII of FIG. 21;

FIG. 23 shows a part region of the corner region illustrated in FIG. 21, along the line XXIII—XXIII of FIG. 21;

FIG. 24 is another embodiment of the part region illustrated in FIG. 23;

FIG. 25 is an overlap region of a flap from a front view;

FIG. 26 is a front view of the overlap region with two flaps folded one inside the other.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Firstly, it should be pointed out that same components are shown by the same reference numerals and referred to by the same component names in the various drawings, so that disclosures made throughout the description can be applied in terms of meaning to same components having the same reference numerals and the same component names. The terms used to describe positions in the description, e.g. top, bottom, side, etc., relate to the specific drawing being described and can be applied in terms of meaning to any new position which might be illustrated. Furthermore, individual features or combinations of features from the different embodiments described and illustrated may represent independent inventive solutions in their own right or solutions offered by the invention.

FIGS. 1 to 3 illustrate a container 1, which could also be described as a crate to a certain extent, which is used for transporting food, in particular fresh produce such as fruit and vegetables, but which is also suitable for packaged food items such as milk bottles, milk cartons or similar.

The container 1 consists of a plurality of flaps 2 to 6, in particular four or more, the container illustrated having a rectangular surface area, as opposed to a triangular surface area, and five flaps 2 to 6.

The flap 6 in this case forms a base and the flaps 2 and 4 form side end walls whilst flaps 3 and 5 form longitudinal side walls. This particular wording is used simply because the base, namely the flap 6, is a rectangular surface. If the base were square, then all four flaps 2 to 5 forming the side walls would be more or less of the same length.

The individual flaps 2 to 6 may be of any design and could be designed as a framework structure, a spar structure or a plate with reinforcing ribs projecting out on one or both sides.

The particular embodiment illustrated here and given as an example only, is one in which each of the surfaces of the flaps 2 to 6 facing one another is flat and is provided with a small number of orifices 7, e.g. for venting the interior 8. Another of several options is to provide cut-out sections 9 in flaps 2 to 5, which can be designed to provide handgrips.

The embodiment in which the surfaces of the flaps 2 to 6 facing one another are smooth and do not have ribbing offers an advantage in that the food items being transported will not be damaged by projecting parts and this will also make cleaning easier after use.

In order to obtain as favorable as possible a ratio between the volume in the transport state in which the container 1 is empty and the ready-to-use state in which the container 1 is filled with goods or items and foodstuffs, the flaps 2 to 5 are joined to the flap 6 forming the base by means of hinge mechanisms 10.

These hinge mechanisms 10 consist of a hinge pin 11, which is permanently attached, by means of a connecting link 12, to a front edge 13 of the flaps 2 to 5 facing it, being spaced apart therefrom. This hinge pin 12 is pivotally housed in a bearing housing 14 such that it can be removed if necessary.

This bearing housing 14 is designed with a peripheral ridge 16 running in the peripheral edge region across an inner surface 15, in which grooves 17 are provided, spaced at a distance from one another, as a means of receiving the hinge pin 11 across a partial length of the respective flap.

The grooves 17 are open in the direction towards the oppositely lying side wall or end face wall so that the hinge pins 11 can be inserted in and removed from the recessed grooves 17 when the flaps 2 to 5 forming the side walls are moved into a position approximately parallel with the base. Insertion and removal can be effected by elastic deformation of locking pins or locking surfaces but this is not necessarily the case.

By displacing each individual flap 2 to 5 relative to the flap 6 forming the base respectively in a longitudinal direction of the co-operating front edge 13 of the flap 6, one of two end regions 18 of the hinge pin 11 projecting out beyond the connecting link 12 can be pushed into a part of the groove 17 forming a retaining shoulder 19.

This retaining shoulder 19 is so designed that a part of the groove 17 is covered over by means of a cover element 20.

When the end region 18 of the hinge pin 11 is pushed into the retaining shoulder 19, the connecting link 12 moves into a side cheek 22 formed by a recess 21 in the groove 17 and, as is the case, a recess 21 arranged at least in a part of a base plate 23, the length thereof running parallel with the longitudinal direction of the hinge pin 11 and corresponding at least to a width of the connecting link 12 as measured in the same direction. This recess 21 extends across a pivot range of at least 90° relative to the central longitudinal axis 24 of the hinge pin 11.

A length 25 of the groove 17 which lies open at the central region of the flap 6 forming the base is the same size as or slightly larger than a length 26 of the hinge pin 11.

As a result of the structure of the recesses 21 in conjunction with the hinge pin 11 and the connecting links 12, the flaps 2 to 5, in other words the flaps 2 and 4 forming the end faces and the flaps 3 and 5 forming the longitudinal faces, can be folded out from a position against the base—having been folded inwards for transportation purposes—by 180° into a position projecting out from the flap 6 forming the base and parallel therewith—for transportation or cleaning purposes—towards the exterior so that they lie outside the peripheral front end edge of the flap 6 forming the base.

The ready-to-use position is the one in which the individual flaps 2 to 5 are in a position between that in which they are folded out or folded in, relative to the flap 6 forming the base, and are standing perpendicular to the flap 6 subtending an angle of 90° with the base 6.

In order to guide the flaps 2 to 5 into their position relative to the base 6 in a direction in which the front longitudinal-end edges of the flaps 2 to 5 run parallel with one another, the connecting link 12 is guided in the recess 21 between the retaining shoulder 19 and an oppositely lying stop 27 for the greater part of its pivoting movement.

The groove 17 has an approximately U-shaped or C-shaped cross section, so that a vertical axis running symmetrically between the legs is inclined at an angle of from 5° to 25°, preferably 8° to 20°, to the surface of the base in such a way that it rises to the central region of the flap 6 forming the base. A relative displacement can be effected between the flap 6 and the flaps 2 to 5 and the flaps 3 and 5 across this angular range, so that they are guided across stop ridges 29 projecting perpendicular to the internal face 28, in the pivoting region of which the front edges 30, 31 facing flaps 2, 4 forming the end face walls overlap, thereby preventing any relative displacement between the flaps 3, 5 and 6.

Clearly, it would also be possible for these stop ridges 29, in their folded-in position on the base 6, to overlap the front edges 32, 33, running parallel with the end front 30, of the flaps 2, 4 forming the transverse walls.

Clearly, instead of being arranged on the flaps 3, 5 forming the longitudinal side walls, the stop ridges 29 could also be arranged on the flaps 2, 4 forming the transverse end walls so that they likewise overlap the longitudinal side walls 3, 5 or the front end edges running parallel therewith of the flap 6 forming the base.

If, on the other hand as illustrated in this example of an embodiment, the stop ridges 29 are arranged on the flaps 3, 5 forming the longitudinal side walls, the longitudinal central axes 24 of the grooves 17 and the hinge pins 11 are arranged above the surface 15 of the flap 6 by an amount of a thickness 34, as illustrated in FIG. 1, corresponding to the flaps 2, 4. In view of the fact that the peripheral ridges 16 forming the bearing housing 14 for the hinge pins 11 are raised accordingly, an approximately U-shaped receiving channel is formed in conjunction with the flap 6 forming the base so that the flaps 2, 4 forming the transverse side walls are guided laterally by means of the peripheral ridges 16 in the angular range in which the grooves 17 open towards the center of the flap 6 forming the base, so that the end regions 18 of the hinge pins 11 which are guided in the retaining shoulders 19 can not be pushed out of the retaining shoulders 19 during this part of the pivoting movement.

Accordingly, a length 35 is the same as or slightly smaller than an internal width 36 between the side faces facing one another of the bearing housing 14 which receives the hinge pins 11 on the flaps 3 and 5 forming the longitudinal side walls. Furthermore, an internal width 37 between the stop ridges 29 of each of the flaps 3 and 5 forming the longitudinal side walls is the same as or slightly larger than a maximum distance 38 between front edges 39 facing away from one another of the bearing housing 14 for receiving the hinge pins 11 of the flaps 2 and 4 forming the transverse end walls.

Similarly, a height 40 across which the stop ridges 29 project perpendicularly, up beyond the internal surface 28 of the flaps 3, 5 forming the longitudinal side walls, is the same as or slightly smaller than a thickness 34 of the flaps 2, 4 forming the transverse side walls plus a thickness 41 of the flap 6 forming the base, as illustrated in FIG. 3.

Whilst FIGS. 1 to 3 illustrate the basic structure of the container 1 and the general operating principles, a more detailed description will now be given with reference to FIGS. 4 to 13 and 14 to 18, providing a more detailed illustration of the design and layout of the individual flaps 2 to 6.

FIGS. 4 to 6 illustrate one of the two flaps 3, 5 forming the longitudinal side walls of the container 1, flap 3 being in fact chosen for the detailed illustration. FIGS. 4 and 5 provide a more detailed illustration of the structure of the flap 3 or 5.

This flap 3 has a reinforcing brace 42, provided in the form of a hollow member. This reinforcing brace 42 runs closely along narrow front ends 43, 44 of the front edge 13 in a direction towards a longitudinal front-end edge 45.

To improve the transfer of force when containers 1 are stacked one on top of the other, it is expedient if the vertically extending part regions of the reinforcing brace 42 are joined to the horizontal part regions of the reinforcing brace 42 by means of curved members. Likewise, there is an advantage to be had if, in order to strengthen the adjacent part regions of the side walls, the reinforcing brace 42 is arranged offset or in a return arrangement in a direction of the central longitudinal region across a part region of a height 46 of the flap 3 only, by at least the thickness of the corner stays.

The reinforcing brace 42 consists of a hollow plastic section. This hollow plastic section is preferably manufactured by an injection process, the core of the injection mould component being subsequently blown out, provided the plastics material in the central region is still in a liquid or plastic state, in a single work process with the other parts of the flap 3 and 5. Additional bar-shaped longitudinal stays 47, 48 and vertical stays 49 as well as diagonal supporting elements 50 can then be joined on, which will produce a very good rigidity in spatial terms but above all will enable these flaps 3, 5 to sustain a very high vertical load.

The interesting feature here is that centering recesses 51 are arranged in the region of the longitudinal side edge 45 and co-operate with matching centering projections 52 in the flap 6 forming the base of the container 1 lying on top. Since a relatively high degree of stress may also be transmitted into this region, the two diagonal supports 50 facing one another terminate approximately in this region so as to provide an even rigidity across the longitudinal side wall 3, 5 and the individual longitudinal stays 47, 48 and vertical stays 49 between the reinforcing brace 42 and the hinge mechanisms 10, to cope with the massive strain occurring here and in particular to prevent any bowing.

In order to impart high strength and resistance to the hinge mechanisms 10, it is also of advantage if a larger number of hinge pins 11 is provided, distributed across the length of the front edge 13 of the flap 3, 5.

Accordingly, it has proved beneficial to arrange the hinge mechanisms 10 respectively in pairs adjacent to one another and to provide a pivot stop 53 between each pair of hinge mechanisms 10.

The purpose of this pivot stop 53 is to ensure that the flaps 2 to 5 remain in their upright position when the flaps 3, 5 forming the longitudinal side walls but also the flaps 2, 4 are placed upright. A stand surface 54 of these pivot stops 53 also prevents the hinge mechanisms 10 from taking excessive strain. If a higher load than originally planned is placed on the hinge mechanisms 10, the stand surfaces 54 can be supported on the supporting surfaces 55 lying opposite them on the flap 6 forming the base, thereby reducing the load acting on the hinge mechanism 10 and the hinge pins 11 thereof as far as possible.

Since the basic load of the vertical forces acting on the flaps 2 to 5 is transferred via the hinge mechanisms 10, a high surface pressure is produced at least between the end regions 18 of the hinge pin 11 and the bearing housing 14 or groove 17, which will also prevent the end regions 18 of the hinge pin 11, which lie open, from slipping out of their respective grooves 17 in the event of high impacts directed against the flaps 3 and 5 forming the side walls.

Due to the fact that a side edge 56 of the approximately rectangular-shaped stand surface 54 protrudes beyond and forms a tangent with the contour having a contour surface 57 formed by the longitudinal central axis 24 of the hinge pin 11, additional force needs to be applied in order to overcome this mechanical barrier. On the other hand, when the flaps 3, 5 and, for all practical purposes the flaps 2, 4 as well, are arranged in a position approximately vertical to the flap 6 forming the base, this barrier also makes it more difficult for the side walls to collapse of their own accord into a transport position in which they are folded in or out, and holds the flaps 2 to 5, in particular 3 and 5, steady when they are placed upright in a virtually vertical position relative to the flap 6 forming the base, so that the transverse side walls formed by the flaps 2 and 4 can be erected in a single operation.

In view of the fact that the stand surfaces 54 of the pivot stops 53 are arranged at a slight distance 58 above the supporting surfaces 55 of the flap 6 forming the base which cooperate therewith, they impede the pivoting movement to only a negligible degree when setting the flaps 2 to 5 of the as yet unfilled container 1 upright. When the flaps 2 to 5 are swung upwards or placed upright, the side edges 56 run onto the stand surface 54 and, because of the projecting front edges 56, the flaps 2 to 5 are now lifted, as a result of elastic deformation in a direction transverse to an axis 59 of the end regions 18, 60, by that same distance 61 and the distance by which the side edge 56 protrudes beyond the contour surface 57 so that the flaps 2 to 5 can be swung up into a position approximately perpendicular to the flap 6 in which the stand surface 54 is in a position parallel with the support surface 55 and spaced at a slight distance in height above it. Consequently, the flaps 2 to 5 can be pivoted by a slight angular range about the longitudinal axis 24 of the hinge pins 11 but are not able to collapse into their flat position parallel with the flap 6 either onto the flap 6 or out to the side of the flap 6. This makes it easier to erect the flaps 2, 4 forming the transverse side walls and lock them to the flaps 3, 5. This design simultaneously prevents excessive strain on the elastically deformable end regions 18 of the hinge pins 11.

Each of the flaps 2 to 5 is of an approximate thickness 34. This being the case, an axis 59 of the hinge pin 11 running in the plane of the internal surface 28 is preferably arranged at a distance from the internal surface 28 which is greater than half the thickness 34 of the individual flaps 2 to 5. This thickness 34 of the individual flaps 2 to 5 is made up of a height 62, over which an external peripheral ridge 63 delimiting the flaps 2 to 5 projects beyond an external surface 64 of the flaps 2 to 5 lying opposite the internal surface 28, as well as a thickness 65 of the respective flap 2 to 5. In order to make the flaps 2 to 6 more rigid, the longitudinal stays 47, 48, vertical stays 49 and diagonal supports 50 mentioned above are arranged inside the peripheral ridges 63 surrounding the flaps, as can be most clearly seen from the views illustrated in FIGS. 4 and 6.

Whilst the peripheral ridges 63 project beyond the external surface 64 of the flaps 2 to 6, stop ridges 29 in the region of the narrow end faces 43, 44 on plates 3 and 5 forming the longitudinal side walls project out by a height 40, as already described in relation to FIG. 1. Arranged on these peripheral ridges 29 on a face facing the central region of the flap 3, 5 are supporting and centering elements 66, 67, 68, which will be described below in connection with flaps 2 and 4 forming the transverse end walls, which cooperate with matching supporting and centering elements in the peripheral regions of the narrow end faces of the flaps 2 to 4.

In addition, a connecting element 69 of a connecting mechanism 70 is provided for releasably connecting the flaps 2, 4 to the flaps 3, 5 when in their upright position more or less perpendicular to the flap 6. A detailed description of this connecting mechanism 70 will be given below with an explanation of more detailed illustrations.

As may also be seen from the cross-section illustrated in FIG. 5, the peripheral ridge 63 in the region of the longitudinal front end edge 45 lying opposite the hinge pins 11 is provided in the form of a hollow section. The cavity in this region of the peripheral ridge 63 can therefore be made as part of the manufacturing process by blowing, during the cooling process, the still plasticized or liquid plastic from the skin which has already reached a rigid state, using a technique that is already known in various forms from the prior art. In acknowledgement of this technology, in particular the structure of this hollow cavity and the process specifications required for this process, which is also known as airmoulding, the description given in DE 39 40 186 A1 is also incorporated in the contents of this application.

As may also be seen from FIGS. 4 and 6, several hinge pins 11 are arranged along the length of the front edge 13 of the flaps 3 and 5, each of which is provided with its own connecting links 12 at a distance from the front edge 13. The hinge pins 11 retained by means of the connecting links 12 at a distance from the front edge 13 are expediently arranged in pairs such that hinge-pin pairs 71 and 72 arranged adjacent to a longitudinal center of the flaps 3 and 5 have a smaller distance 73 between the individual hinge pins 11 than the hinge-pin pairs 74, 75 arranged in the region of the narrow front ends 43, 44, where the hinge pins 11 are arranged at a distance 76 from one another. Arranged between each of these pairs of hinge pins 71, 72 and 74, 75 are pivot stops 53. Here again, a length 77 of the pivot stops 53 in the direction towards the narrow front ends 43, 44 is smaller between the pairs of hinge pins 71, 72 than between the hinge-pin pairs 71 and 74 or 72 and 75. Due to the hinge pins 11 arranged in the smallest space, a strong and highly load-resistant connection is produced in the region of the cut-out sections 9 from the flaps 3 and 5 provided as handgrips. Nevertheless, the vertical load is more or less evenly distributed across the length when the container 1 is lifted because, as already explained above, an additional support is provided in the vertical direction in the region of the narrow front ends 43, 44 by means of the supporting and centering elements 66, 67, 68.

There is also the fact that the longer length of the pivot stops 53 in the region of the narrow front ends 43, 44 is better suited to preventing the flaps 2 to 5 from collapsing since the flaps have a tendency to fold down inwards in the corner regions, possibly because of the eccentrically projecting weighting components, not least due to the layout of the projecting stop ridges 29 with the supporting and centering elements 66 to 68.

As may be seen particularly clearly from the enlarged diagram given in FIG. 7, but also from the diagram of FIG. 6, the end regions 18, 60 are provided with a conical guide surface 78 at their ends remote from the connecting pin link 12. As will be described in connection with the next few drawings, the purpose of these is to make it easier to insert the hinge pins 11 of the individual flaps 2 to 5 in the groove 17 and retaining shoulder 19. Accordingly, as can be seen more clearly from FIG. 7, the length 77 of the pivot stop 53 is smaller than a recess 79 in the bearing housing 14, which in turn has a length 80. The difference between the length 77 and the length 80 normally corresponds to a pin length 81 of the end region 18 projecting beyond the connecting link 12 so that once the hinge pin 18 has been inserted in the groove 17, the entire pin length 81 can be guided by a sliding action of the flaps 2 to 5 relative to the flap 6 into the retaining shoulder 19 in the bearing housing 14, so as to produce a correspondingly large guide and support surface. Clearly, however, it would also be possible for the length 80 to be longer than the pin length 81 by a length greater than the length 77 of the pivot stop 53.

For practical purposes, a height 82 of the pivot stop 53 is the same size as a width 83—as seen in FIG. 1—of the bearing housing 14. In either case, care should be taken to ensure that a distance 84 between the longitudinal central axis 24 of the hinge pin 11 and the stand surface 54 of the pivot stop 53 is no greater than a distance 85, as seen in FIG. 10, between the longitudinal central axis 24 of the groove 17 receiving the hinge pin 11 in the bearing housing 14 and an internal side wall 86 of the bearing housing 14 facing the flap 6 or the middle region of the flap 6.

The effect of this is that when flaps 2 to 5 are folded outwards as a result of the pivot stop 53 lying fully flat on the support surfaces 55 of the bearing housing 14, the hinge pins 11 are relieved of any strain and, on the other hand, even in this position, the flaps 2 and 4 forming the end side walls can be constrained or fixed in their transport position lying on the flap 6.

If it is specifically desirable to prevent such a position, it would clearly also be possible to design the distance 84 so that it is greater than the distance 85 so that when the longitudinal side walls are folded outwards, the flaps 2 and 4 forming the end side walls can be constrained and set down on the flap 6 forming the base.

Similarly, the connecting link 12 is so dimensioned that a measurement 87 between the front edge 13 and an adjacent surface part of the end region 18 of the hinge pin 11 facing it is slightly greater than a distance 88 between the end region 18 and the surface of the covering element 20 facing the front edge 13, this measurement 87 corresponding to a thickness 89 of the covering element 20 at an end region 18 abutting with the covering element 20.

As a result, stress applied via the flaps 2 to 5 and acting on the flap 6 when the flaps 2 to 5 are upright, in other words in a ready-to-use position, a minimum force will initially be applied to the hinge pins 11 and the end regions 18, 60 and released in the grooves 17 so that the flaps 2 to 5 will be checked against additional shifting or slipping out from the grooves 17 of the flap 6 and any additional strain which might dislodge the hinge pins 11 and the end regions 18, 60 can be avoided due to the fact that the flaps 2 to 5 forming the side walls are directly supported on the bearing housings 14.

These dimensions may be specified so that the difference between the thickness 89 and the measurement 87 is the same as the distance 58 between the stand surface 54 and the support surface 55 of the flaps 2 to 5 and the flap 6.

However, for practical purposes, these dimensions may also vary so that depending on whether the forces are acting on the flaps 2 to 5 or on the flap 6 forming the base, they can be optionally either initially transmitted via the front edge 13 or the pivot stop 53 and then via the other respective component into the flap 6 forming the base.

FIGS. 8 to 11 illustrate one of the flaps 2, 4 forming the transverse side walls of the container 1 and will be described in detail, the same reference numerals being used to refer to the same parts as those described in relation to the flaps 3, 5.

This flap 2 also has a reinforcing brace 42, designed as a hollow component and made using a method known from the prior art, already explained at length in the detailed description relating to FIGS. 4 to 7.

Several hinge mechanisms 10 consisting of hinge pins 11 spaced at a distance from the front edge 13 by means of connecting links 12 are again provided on the bottom front edge 13 of the flap 2. These hinge pins 11 have two end regions 18, 60 projecting in a direction of the longitudinal extension of the flap 2 on either side of the connecting link 12. In the case of this flap 2, a respective hinge pin-pair 93, 94 is provided for a width 90 respectively in a direction from the narrow front ends 91, 92. Another hinge pin 11 is provided for the region of the front edge 13 at the center region of the flap 2. A distance 95 between the hinge pins 11 of the two hinge-pin pairs 93, 94 is smaller than a distance 96 between the hinge pin provided in the center region of the flap 2 and the hinge pin 11 of the two hinge-pin pairs 93, 94 arranged adjacent to this hinge pin 11.

The reinforcing brace 42 mentioned above runs along the longitudinal front end edge 45 of the flap 2, and then extends at either side of the flap 2 parallel with the narrow front ends 91, 92 and projects at an incline at either side of the flap 2 in a direction towards the front edges 13 running in a direction towards a center of the flap 2 and terminating in the region of the peripheral ridge 63 of the flap 2, this reinforcing brace 42 and the end regions of the reinforcing brace 42 facing the front edges 13 being arranged in the region of the distance 95 between the hinge pins 11 of the hinge-pin pairs 93, 94.

Similarly to flap 3, the flap 2 has longitudinal stays 47, 48, diagonal supports 50 and vertical stays 49, which produce a better distribution of load across the flap 2 and into the flap 6 forming the base. By linking with the other bar-like longitudinal stays 47, 48 and vertical stays 49 as well diagonal supports 50, a very good spatial rigidity can be produced, which above all gives the flaps 2, 4 the ability to withstand a high vertical load.

Centering recesses 51 are arranged in the region of the longitudinal front end edge 45, which can cooperate with matching centering projections in the flap 6 forming the base of the container 1 lying on top. Since a relatively high degree of stress may also be transmitted into this region through the container 1 lying on top, the two diagonal supports 50 facing one another terminate approximately in the region of these centering recesses 51 so as to distribute the massive resultant strain evenly across the transverse side wall and the individual longitudinal stays 47, 48 and vertical stays 49, so that they can be deflected into the flap 6 forming the base. In addition, the advantageous design of the hinge mechanisms 10 proposed by the invention make it possible to provide several hinge pins 11—as will be explained below in more detail—so that the deflection of forces into the flap 6 forming the base can be significantly improved.

The deflection of forces into the flap 6 forming the base can be further improved in that the end regions of the reinforcing brace 42 facing the front edge 13 terminate in the region of the distances 95 between the hinge pins 11 of the hinge-pin pairs 93, 94 so that the force applied via the reinforcing brace 42 can be evenly distributed to the two hinge pins 11 of the two hinge-pin pairs 93, 94 thereby avoiding excessive strain on an individual hinge pin 11 or the end regions 18, 60 thereof.

Clearly, it would also be possible to design the flaps 2, 4 so that they have pivot stops 53 in the region of the distances 95, 96, as mentioned in the detailed description of flaps 3, 5, thereby offering the advantages that can be had by using a pivot stop 53 of this design as explained in the more detailed description relating to FIGS. 4 to 7.

In the region of the narrow front ends 91, 92, the flap 2 or the flaps 2, 4 have projecting supporting and centering elements 98 to 102 extending in a direction of the reinforcing brace 42 and across a thickness 97 of the flaps 2, 4 in the region between the reinforcing brace 42 and the hinge mechanism 10—as illustrated in FIG. 9. These supporting and centering elements 98 to 102 improve the transmission of force and the centering action in the region where the flaps 2, 4 connect with the flaps 3, 5 at the supporting and centering elements 66 to 68 of the stop ridges 29 of the flaps 3, 5, as will be explained in more detail below.

As may be seen from FIG. 1, the thickness 103 of the flaps 2, 4 in the region of the narrow front ends 91, 92 is smaller than the thickness 34. The thickness 103 is smaller than the thickness 34 by a thickness 104 of the stop ridges 29 of the flaps 3, 5 so that the thickness 34 is not exceeded when the stop ridges 29 of the flaps 3, 5 locate in the peripheral regions of the flaps 2, 4 in a position which locks the flaps 2 to 5 with one another in the region of the narrow front ends 91, 92 of the flaps 2, 4. As a result of this advantageous design of the narrow front ends 91, 92 of the flaps 2, 4, there is no projection to interfere with the container 1 in the ready-to-use position, in spite of the protruding stop ridges 29 of the flaps 3, 5, making handling of a container 1 of this type much easier.

As illustrated in FIGS. 8, 10, 11, in the region of the narrow front ends 91, 92 of the flaps 2, 4 between the peripheral ridge 63 and the reinforcing brace 42 a respective connecting compartment of the connecting mechanism 70 is provided on either side for receiving the connecting element 69, a more detailed description of this connecting mechanism 70 being given farther on in this description.

Each of the flaps 2 to 5 is of approximately the same thickness 34. By preference, an axis 59 of the hinge pin 11 extending in the plane of the internal surface 28 is arranged at a distance from the internal surface 28 of less than half the thickness 34 of the individual flaps 2 to 5. The thickness 34 of the individual flaps 2 to 5 is made up of a height 62, over which the external peripheral ridge 63 delimiting the flaps 2 to 5 projects beyond an external surface 64 of the flaps 2 to 5 lying opposite the internal surface 28 as well as the thickness 97 of the respective flap 2, 4. In order to make the flaps 2 to 5 more rigid, the longitudinal stays 47, 48, vertical stays 49 and diagonal supports 50 mentioned above are arranged inside the peripheral ridges 63 surrounding the flaps 2 to 5, as can be most clearly seen from the views illustrated in FIGS. 4, 6, 8, 10 and 11. As also illustrated in FIG. 9, the peripheral ridge 63 is designed as a hollow section in the region from the longitudinal front end edge 45 lying opposite the hinge pin 11.

As can be seen more clearly in FIG. 11, the connecting link 12 is so dimensioned that a measurement 87 between the front edge 13 and an adjacent surface part of the end region 18 of the hinge pin 11 facing it is slightly greater than a distance 88 between the end region 18 and the surface of the covering element 20 facing the front edge 13, this distance 88 corresponding to a thickness 89 of the covering element 20 at an end region 18 abutting with the covering element 20.

As a result, stress applied via the flaps 2 to 5 and acting on the flap 6 when the flaps 2 to 5 are upright, in other words in a ready-to-use position, a minimum force will initially be applied to the hinge pins 11 and the end regions 18, 60 and released in the grooves 17 so that the flaps 2 to 5 will be stopped from additionally shifting or slipping out from the grooves 17 of the flap 6 and any additional strain which might dislodge the hinge pins 11 and the end regions 18, 60 can be avoided due to the fact that the flaps 2 to 5 are directly supported on the bearing housings 14.

These dimensions may be specified so that the difference between the thickness 89 and the measurement 87 is the same as the distance 58 between the stand surface 54 and the support surface 55 of the flaps 2 to 5 and the flap 6.

However, for practical purposes, these dimensions may also vary so that depending on whether the forces are acting on the flaps 2 to 5 or on the flap 6 forming the base, they can be optionally either initially transmitted via the front edge 13 or the pivot stop 53 and then via the other respective component into the flap 6 forming the base.

FIGS. 12 and 13 illustrate a front view and a side view of the flap 6 forming the base. From these, it can be seen that the flap 6 forming the base has peripheral ridges 16 of varying heights for the flaps 2, 4 and 3, 5.

By preference, a total thickness 105 of the base and the peripheral ridge 16 with the bearing housings 14 in the front end region of the flap 6 and in the region for receiving the flaps 2, 4 corresponds to a sum of a thickness 106 of the flap 6 plus a thickness 107 of the hinge pin 11 and a thickness 108 of the cover element 20, the thickness 107 of the hinge pin 11 of the hinge mechanism 10 preferably being the same as a diameter 109 of the groove 17 receiving the hinge pin 11. In addition, the hinge pin 11 is arranged on the flaps 2 to 5 in the plane of the internal surface 28 in which the axis 59 of the hinge pin 11 runs at a distance from the internal surface 28 of the flaps 2 to 5 which is less than a half of the thickness 34 of the individual flaps 2 to 5. This advantageous design makes the best possible use of space when the flaps 2 to 5 are collapsed so that the containers 1 can be stacked for transport taking up the smallest possible height, making transportation of these containers 1 very economical.

As may be seen from the diagram of FIG. 13, a total thickness 110 of the peripheral ridges 16 with the bearing housings 14 for the flaps 3, 5 is preferably greater than a total thickness 105 of the peripheral ridges 16 with the bearing housings 14 in the region of the flaps 2, 4 by the thickness 34 of the flaps 2, 4. As a result of this design, the flaps 3, 5 can be freely folded down on top of the flaps 2, 4 already folded down onto the flap 6 so that the stacking height for several containers 1 can be optimized still further.

As may also be seen from the drawings, the flap 6 forming the base has rims 112 projecting out from an underside 111, designed for placing the container 1 down on a floor. An external measurement 113 of the rims 112 extends out in a side view of the flap 6 and an external measurement 114 of the rims 112 extends out in a front view of flap 6, the external measurement 113 corresponding more or less to an internal width 115 between flaps 2, 4 when locked in their upright position—as may be seen from FIG. 2—whilst an external measurement 114 corresponds more or less to an internal width 116 between flaps 3, 5 when locked in their upright position. By giving the rims 112 these dimensions, it is easier to stack the containers 1 in their ready-to-use position, i.e. when the flaps 2 to 5 are positioned vertically to the flap 6, securely preventing the stacked containers 1 from sliding against one another in a horizontal direction due to the fact that the rims 112 locate by a height 117 in the interior 8 of the container 1 lying underneath, the rims 112 being surrounded by or abutting in a positive fit with the flaps 2 to 5 of the container 1 lying underneath.

As is also clear from the diagram of FIG. 13, the peripheral ridge 16 for the flaps 3, 5 stands out facing the front edges 39 of the peripheral ridges 16 for the flaps 2, 4 by a dimension 118. This dimension 118 more or less corresponds to the thickness 104 of the stop ridges 29 of the flaps 3, 5, giving the container 1 a flat front end when collapsed into the transport position.

As illustrated in FIG. 12, the longitudinal central axes 24 of the grooves 17 provided for receiving the hinge pins 11 for the flaps 3, 5 are spaced at a distance opposite the longitudinal central axes 24 of the grooves 17 for the flaps 2, 4 by a height 119 which corresponds approximately to a thickness 34 of the flaps, this height 119 varying in value accordingly in the event of a change in thickness of the flaps 2 to 5 so that if the thickness 34 of the flaps 2 to 5 is increased, the height 119 is also increased and conversely if the thickness 34 of the flaps 2 to 5 is reduced, the height 119 is reduced in size in relation to this altered thickness of the flaps 2 to 5.

FIGS. 14 to 18 illustrate an embodiment of a hinge mechanism 10 proposed by the invention comprising hinge pins 11 with end regions 18, 60 inserted in the groove 17.

The bearing housing 14 is illustrated to show the hinge pin 11 with its two end regions 18, 60 and the connecting link 12 joining each hinge pin 11 to a respective flap 2 to 5. The end region 18 of the hinge pin 11 has at its front end a conically extending guide surface 78, this guide surface 78 having arranged adjacent to it a retaining shoulder 19 of the groove 17 which is provided as a means of receiving the end region 18 of the hinge pin 11.

It should be pointed out that basically, the flaps 2 to 5 have hinge mechanisms 10 in the region above front edges 13 of the flaps 2 to 5 facing the flap 6 which forms a base and are adjustably connected in their upright position and at least one hinge pin 11 running parallel with a front edge 13 of a flap 2 to 5 is retained at a distance by means of a connecting link 12 and can be inserted in the groove 17 of another flap 6. The groove 17 has a groove floor 120, which is of a concave design, the groove 17 having two end regions 121, 122 and the end region 122 is closed across a diameter 123 of the groove 17 by means of the retaining shoulder 19 and the cover element 20 and forms a housing chamber 124 for the end region 18 of the hinge pin 11.

As may be seen from the drawings, a diameter 123 of the groove 17 is preferably the same size as a diameter 107 of the hinge pin 11, so that the hinge pin 11 sits in the groove 17 and the retaining shoulder 19 closed off by means of the cover element 20 without any play. The groove 17 is arranged, at least in part regions, in a bearing housing 14 in a peripheral ridge 16 projecting above the flap 6 and has an open length 25, which corresponds to at least the length 26 of the hinge pin 11. Arranged in the region of the side cheek 22 of the groove 17 in a region where the connecting link 12 pivots about a longitudinal central axis 24 of the groove 17 is a clearance recess 21 extending in a radial direction which is delimited in the direction of the longitudinal central axis 24 of the groove 17 by the retaining shoulder 19 and by the stop 27. A distance 125 between the retaining shoulder 19 and the stop 27 is at least the same as a length 126 of the connecting link 12 measured in the direction of the longitudinal central axis 24 but not longer than the length 126 of the connecting link 12 plus the pin length 81 of the end region 18 of the hinge pin 11 projecting beyond it in the same direction.

The pivotal connection between the groove 17 and the hinge pin 11 and hence between two flaps 2 to 6 is designed as follows. The entire hinge pin 11 has a length 26, which is the same as or slightly smaller than an open length 25 of the groove 17 so that the hinge pin 11 can be inserted in the groove 17. This is done when the connecting link 12 is in an angled position so that the position for assembling the hinge mechanism 10 is not the same as the ready-to-use position of the container 1. Once the hinge pin 11 has been inserted in the groove 17, the end region 60 of the hinge pin 11 will be lying against an internal front edge 127 of the groove 17 and is therefore fixed in its position in the opposite direction from the retaining shoulder 19. The hinge pin 11 is prevented from moving transversely to the longitudinal extension of the groove 17 due to the fact that a diameter 123 of the groove 17 is of the same diameter 107 as the hinge pin 11 and the hinge pin 11 and the groove 17 therefore have the same longitudinal central axis 24.

If the hinge pin 11 is now inserted through the open length 25 of the groove 17 into the groove 17, the hinge pins 11 in the grooves 17 are guided so that the hinge pins 11 can be displaced relatively in the grooves 17 along the longitudinal central axis 24 in the direction of the retaining shoulder 19. If the hinge pin 11 is now pushed in the direction of the end region 122 of the groove 17, the end region 18 of the hinge pin 11 penetrates the housing chamber 124 of the retaining shoulder 19 circumferentially closed off by the closing element 20, which means that this procedure can be significantly facilitated by the design of the guide surface 78 on the end region 18 of the hinge pin 11. By preference, the end region 18 of the hinge pin 11 now moves into abutment against an internal front face 128 of the housing chamber 124, although it is possible to leave a distance between them since a front face 129 of the connecting link 12 facing the retaining shoulder 19 moves into abutment against a front face 130 of the retaining shoulder 19 facing the connecting link 12 and is guided therethrough, as can be seen from FIG. 18.

The radially extending recess 21 is arranged between the end face 130 of the retaining shoulder 19 and the stop 27 of the side cheek 22 of the groove 17. Since the length 126 of the connecting link 12 measured parallel with the longitudinal central axis 24 is of the same size as or slightly smaller than a distance 125 between the end face 130 of the retaining shoulder 19 and the stop 27 of the side cheek 22 of the groove 17, it is possible for the hinge pin 11 to turn in the groove 17 or for the connecting link 12 to pivot relative to the position of the connecting link 12 when placed in the groove 17.

For this purpose, it should be pointed out that a curvature length 131 of the recess 21 is critical to the degree to which the connecting link 12 pivots, and hence the pivoting range of a flap 2 to 5 fitted with the hinge pin 11, and the connecting link 12 is restricted by this recess. Accordingly, with this embodiment, is it also possible to use a different shaping in order to reduce or increase the curvature length 131 of the recess 21, which will in turn allow the increase or reduction in the pivoting range of a flap 2 to 5 to be adjusted.

As may be seen from FIGS. 15 to 17, an end region of the side cheek 22 facing the open end of the groove 17 has an inclined surface 132 running in a direction of the longitudinal central axis 24, the purpose of this inclined surface 132 being to make it easier to insert the hinge pin 11 in the groove 17. It is also possible, as illustrated in FIG. 17, to make an opening width 133 of the groove 17 slightly smaller than the diameter 107 of the hinge pin 11 so that the hinge pin 11 snaps into the groove 17 ensuring that the hinge pin 11 can not work loose from the groove 17 of its own accord.

FIG. 17 illustrates a different embodiment of the groove 17 for receiving the hinge pin 11. This embodiment largely corresponds to that illustrated in FIG. 16 and in this case a recess 134 is arranged lying opposite the cover element 20, which matches the external contour of the hinge pin 11 so that the hinge pin 11 sits with its entire surface area in this recess 134. As a result of this design, a height 135 of the groove 17 and the housing chamber 124 is increased in the region of the longitudinal central axis 24. As a result, the longitudinal central axis 24 is offset relative to a center of the opening width 133 so that the hinge pin 11 has to be lifted by an amount 136 corresponding to the depth of the recess 134 in order to remove it from the groove 17.

The position of the hinge pin 11 and the connecting link 12 illustrated represents the ready-to-use position of the hinge mechanism 10, i.e. the position in which the flaps 2 to 5 are in the vertical upright ready-to-use position relative to the flap 6. In this position, when the containers 1 are stacked one on top of the other, the greatest force is exerted on the hinge mechanisms 10 and the hinge pins 11, so that a high surface pressure builds up between the groove floor 120 and the external surface of the hinge pin 11 cooperating with this groove floor 120. This surface pressure prevents the hinge pin 11 from working loose from the groove 17, as might otherwise occur under certain undesirable circumstances, e.g. due to impacts on the flaps 2 to 5 from outside.

The embodiment illustrated in FIG. 17 has an advantage due to the fact that the hinge pin 11 has a greater bearing surface in the recess 134 so that the transfer of forces from the hinge pin 11 to the flap 6 can be significantly improved. Furthermore, in the event of undesirable circumstances, e.g. external impacts on the flaps 5 to 7, the hinge pin 11 subjected to stress must firstly overcome the dimension 136 of the recess 134 before it can move out from the groove 17 so that this embodiment makes it all the more difficult for any such shifting out of the groove 17. Furthermore, because of the enlarged bearing surface afforded to the hinge pins 11 in the grooves 17, the possible absorption of force or deflection of force via the hinge pins 11 into the flap 6 is improved and increased and this embodiment therefore increases the service life of hinge mechanisms of this type.

The connecting mechanism 70 will be described in detail with reference to FIGS. 19 to 22. The description is given in relation to a flap 5, for example, onto which the connecting element 69 is formed on the stop ridge 29 in a single piece, and in relation to a part region of the flap 2, this flap 2 having a connecting seat 137 in the region of the peripheral ridge 63 which matches the connecting element 69. This embodiment is not restricted to the variant described here but can be provided in all corner regions of the container 1.

A more detailed explanation of the flaps 5 and 2 selected as an example can be obtained from the detailed description given above of the respective flaps 2, 5.

Due to the design of the flaps 2, 5, the corner region of a container 1 of this type has an overlap region 138 between the narrow front ends 44, 92 of the two flaps 2, 5, and the connecting mechanism 70 provides a means of releasably connecting the flaps 2, 5 when in a position extending perpendicular to the flap 6 forming the base, which prevents the link between the flaps 2, 5 from coming loose of its own accord.

As described above, the stop ridge 29 of the flap 5 has supporting and centering elements 66 to 68 on its side facing the longitudinal center of the flap 5. The connecting element 69 is arranged between the supporting and centering element 66 and the longitudinal front end edge 45 of the flap 5. Opposite, the peripheral region of the flap 2 forming an overlap region 138 with the flap 5 has a congruently arranged connecting seat 137 with elastically deformable retaining elements 139.

The connecting element 69 is designed as a mushroom-head projection 140 and the connecting seat 137 and the retaining elements 139 opposite have protrusions 141 which locate behind the mushroom-head of the projection 140. It should be pointed out in principle that the connecting element 69 may be of any possible design or in any possible angular position relative to the height extension of the stop ridge 29 whilst the connecting seat 137 is arranged in a congruent position in the peripheral region of the flap 2. Clearly, it is also possible for several connecting elements 69 or connecting mechanisms 70 to be distributed across the height extension of the stop ridge 29 in order to improve the connection of the two flaps 2, 5 in their corner region.

In order to connect the connecting element 69 with the connecting seat 137, the flap 5 or the flaps 3, 5 are brought into a vertical position relative to the flap 6 and then the flaps 2, 4 are folded up into their ready-to-use position. When the connecting elements 69 come into contact with the connecting seat 137, they engage with a conical guide surface 142 in a conical recess 143 of the connecting seat 137. In addition, the conical guide surface 142 of the projection 140 locates in the same manner in the conically extending recess 143 of the connecting seat 137 and pressure is applied to the projection 140 so that the retaining elements 139 open out relative to the projection 140, thereby enlarging an opening width 144 of the connecting seat 137.

The advantage of this is that a front end width 145 of the projection 140 is smaller than an opening width 146 of the retaining elements 139 facing this front end of the projection 140. With this advantageous design, before snap-fitting the projection 140 into the connecting seat 137, it is possible to center it in the correct position, thereby making it easier to make a connection between the flaps 2, 4 and the flaps 3, 5. It should be pointed out in principle that this arrangement is valid for all possible designs of connecting elements 69 and connecting seats 137 and the connecting elements 69 and connecting seats 137 may be circular, square or polygonal in design. The resilient design of the retaining elements 139 is obtained as a result of the elasticity of the plastic material and by arranging any number of recesses 147 along the retaining elements 139.

When the projection 140 is guided into the connecting seat 137, the retaining elements 139 widen relative to the projection 140 so that they slide along the guide surface 142 of the projection 140 and, when the side walls 2, 5 are closed, locate behind the projection 140 thereby preventing the flap 2 from working loose from the flap 5 of its own accord.

By giving the retaining elements 139 of the connecting seat 137 a resilient design, the connecting mechanism 70 can be released again if necessary, this being done by applying force in the opposite direction, as described above. In order to make this easier, a conical guide surface may duly be provided on the side of the retaining elements 139 lying opposite the conical recess 143.

As illustrated in FIGS. 19 and 20, the supporting and centering elements 66 to 68 and the supporting and centering elements 98 to 102 are arranged on the stop ridge 29 of the flap 5 and in the peripheral region of the flap 2. It should be pointed out that the supporting and centering elements 66 to 68 and 98 to 102 may be laid out in the cooperating regions of the flaps 2, 5 and 3, 4 in various different spatial directions relative to one another. In order to produce this effect, the supporting and centering elements 66 to 68 and 98 to 102 may be provided in any possible design, but are preferably of an S-shaped or L-shaped design although straight rims may also be used for the supporting and centering elements 66 to 68 and 98 to 102.

In the peripheral regions of the flaps 2, 4, the supporting and centering elements 98, 99 form a support seat 148 for the supporting and centering elements 66, 67 arranged on the stop ridge 29 of the flap 5 which locate between the supporting and centering elements 98, 99 when the two flaps 2, 5 are in their locked state. In order to improve the transfer of load and centering between the flaps 2, 4 and 3, 5, on the other hand, the two supporting and centering elements 67, 68 form a support seat 149 for the supporting and centering elements 99, 100 of the flaps 2, 4. In addition, the supporting and centering elements 101, 102 provide another support seat 150 for another supporting and centering element 151 on the stop ridge 29 of the flaps 3, 5.

As a result of their spatial layout, the supporting and centering elements 66 to 68 have transition regions 152 running parallel with a height extension of the flap 5, which are arranged apart from the internal surface 28 of the flap 5 by a distance 153. In order to guarantee a solid locking fit and attachment of the flaps 2, 4 to the flaps 3, 5, the distance 153 is the same size as a thickness 154 of the peripheral ridge 63 of the flaps 2, 4, as a result of which the regions of the peripheral ridge 63 of the flaps 2, 4 cooperating with the transition regions 152 of the flap 3, 5 lie or abut in a positive fit between the internal surface 28 and the transition regions 152.

Notches 155 are provided in the peripheral ridge 63 of the flaps 2, 4 to receive part regions 156 of the supporting and centering elements 66, 67, 151, a depth of these notches 155 corresponding to a height of the part regions 156 of the supporting and centering elements 66, 67, 151 measured perpendicular to the stop ridge 29.

Due to the cooperation of the supporting and centering elements 66 to 68 and 151 with the supporting and centering elements 98 to 102, and because the part regions 156 locate in the notches 155, a more stable joint is produced between the individual flaps 2, 4 and the flaps 3, 5, thereby improving the deflection of forces in the overlapping flaps 2, 5 and 3, 4 on the one hand and significantly enhancing the stability of the container 1 overall as a result of these arrangements.

FIGS. 23 and 24 illustrate the overlapping regions of the supporting and centering elements 66 to 68 of the flap 5 with the supporting and centering elements 98 to 100 of the flap 2 in more detail.

As may be seen from FIG. 23, the external faces 157 of the supporting and centering elements 98 to 100 abut with external faces 158 of the supporting and centering elements 66 to 68 of the stop ridge 29 in a positive fit. The advantage to be gained by an arrangement of this type is that a height 159 of the supporting and centering elements 98 to 100 can be the same as a height 160 of the supporting and centering elements 66 to 68, which makes it possible to produce the best possible load transfer via the external faces 157, 158 thereof. Furthermore, it increases the desirable stability of the container 1 significantly. Another advantage of this design resides in the fact that the supporting and centering elements 98 to 100 and 66 to 68 assume a supporting function to a certain degree because of the way in which they abut with the respective oppositely lying flaps 2, 5, thereby duly avoiding any deformation of the stop ridge 29 of the flap 5 which might otherwise by caused by the effect of external force.

As may be seen from FIG. 24, the external faces 157, 158 may be designed as inclined surfaces so that they locate in one another accordingly when the flap 2 is in the state in which it is joined to the flap 5. To this end, the supporting and centering elements 98 to 100 of the flap 2 may taper in a direction towards the stop ridge 29 of the flap 5 whilst opposite these, the supporting and centering elements 66 to 68 of the stop ridge 29 of the flap 5 likewise taper in a direction towards the flap 2.

As a result of this advantageous embodiment, when the flap 2 is pushed lightly towards the flap 5 to bring the flap 2 together with the flap 5 and with the stop ridge 29 thereof, the latter can be optimally centered relative to the other flap 5, which also facilitates the action of inserting the connecting element 69 in the connecting seat 137 of the connecting mechanism 70, described above.

It should be pointed out in principle that the supporting and centering elements 66 to 68 are of an L-shaped design and the transition regions 152 and the part regions 156 adjoin the supporting and centering elements 66 to 68 at a right angle. This spatial design makes the supporting and centering elements 66 to 68 significantly more stable, as can be seen from FIG. 19.

FIGS. 25 and 26 illustrate an overlapping region 161 of flaps 3, 5.

If a sum of the heights of the flaps 3, 5 is greater than a width measured on the front end of the flap 6 forming the base, it is necessary to provide an overlapping region 161 in which the flaps 3, 5 engage in one another but without increasing a thickness 34 of the flaps 3, 5 in the overlapping region 161 so as not to increase the stacking height of containers 1 in the transport position. The flaps 3, 5 again have the reinforcing brace 42 at their upper end region and in the region of the longitudinal front end edge 45, whereby the hollow section provided as a reinforcing brace 42 has notches 162 in certain regions on the side remote from the internal surface 28 along the longitudinal extension of the reinforcing brace 42, so that projections 163 are formed along the longitudinal extension of the reinforcing brace 42. In addition, the reinforcing brace 42 has other recesses 164 along its longitudinal extensions, a depth of these recesses 164 being greater than a wall thickness 165 of the hollow section of the reinforcing brace 42.

In order to increase the stability of the overlapping region 161 of the flap 3, 5, reinforcing ribs 167 are integrally formed on the flap 3 on the side of the flap 3 lying opposite the internal surface 28 extending from the reinforcing brace 42 in a direction towards a reinforcing strut 166 across the longitudinal extension of the flaps 3, 5, the reinforcing ribs 167 being tapered starting from the reinforcing brace 42 in a direction towards the internal surface 28 of the flap 3 and extending in an end region facing the reinforcing strut 166 parallel with the internal face 28 of the flap 3. Adjacent to the reinforcing strut 166 in the direction of the reinforcing brace 42 is an orifice 168 running through the flap 3 and extending through the entire longitudinal extension of the flap 3 and bordered by the stop ridges 29 of the flap 3. This orifice 168 is bridged by the reinforcing ribs 167 arranged between the reinforcing brace 42 and the reinforcing strut 166, thereby ensuring that the orifice 168 does not reduce the stability of the flap 3, 5. When two flaps 3, 5 of the same construction are folded one on top of the other in the overlapping region 161, the projections 163 of the reinforcing brace 42 engage in the orifice 168 thereby forming a join flush with the internal surface 28 of the flaps 3, 5. As a result of this advantageous embodiment, the reinforcing brace 42 will provide an adequate supporting effect for the side walls 3, 5 if several containers 1 are stacked one on top of the other in readiness for transport.

In order to ensure that the container 1 and the flaps 3, 5 are sufficiently stable in the transverse direction, the reinforcing ribs 167 arranged between the reinforcing braces 42 and the reinforcing struts 166 locate in their matching recesses 164 in the reinforcing braces 42 when the flaps 3, 5 are folded on so that the dimension of the recesses 164 more or loss corresponds to a thickness of the reinforcing ribs 167 in terms of width.

In order to avoid increasing the stacking height of the containers 1 in the collapsed state unnecessarily, the flaps 3, 5 forming the side walls overlap with one another when folded down onto the flap 6 forming the base in readiness for transport and a thickness 169 of the flaps 3, 5 lying one on top of the other is no greater than the thickness 34 of one of the individual flaps 2 to 5. In addition, an external end face 170 of the reinforcing brace 42 engages in a reciprocally extending groove in the reinforcing brace 42 of the oppositely lying flap 3, 5.

In principle, as illustrated in the figures, it should be pointed out that, at least in part regions, the groove 17 is arranged in a peripheral ridge 16 projecting out from one of the flaps 2 to 5 and has an open length 25 corresponding at least to the length 26 of the hinge pin 11 and a recess 21 is provided in the region of one of the side cheeks 22 of the groove 17 extending in a radial direction and leaving free a range so that the connecting link 12 can pivot about a longitudinal central axis 24 of the groove 17, being delimited in the direction of the longitudinal central axis 24 of the groove 17 by the retaining shoulder 19 and a stop 27, and a distance 125 between the retaining shoulder 19 and the stop 27 is at least the same as a length 126 of the connecting link 12 running parallel with the hinge pin 11 but not greater than the sum of the length 126 of the connecting link 12 and a pin length 81 of the end region 18 of the hinge pin 11 projecting beyond it in the same direction.

In addition, arranged between at least two hinge pins 11 arranged in the region of a front edge 13 of a flap 2 to 5 is a pivot stop 53 which is effective at least when the flaps 2 to 5 are placed in an upright position and which projects into a circle circumscribed by an advance angular distance needed to place the flaps 2 to 5 in an upright position, which runs coaxially with an axis 59 of the hinge pin 11 and has a radius which corresponds to a measurement 87 of the axis 59 from the front edge 13 of the other flap 2 to 5 facing it.

In order to connect the flaps 2 to 5 to one another, the connecting mechanism 70 is provided in the form of a connecting element 69 arranged permanently fixed in a flap 3, 5, which projects in a direction towards the other flaps 2, 4 and cooperates with a connecting seat 137 with elastically deformable retaining elements 139 provided in a congruent arrangement on the other flap 2, 4.

Furthermore, the supporting and centering elements 66 to 68, 151 and 98 to 102 are arranged in the plane of a flap 2 to 5 extending in several different spatial directions relative to one another.

For the sake of good order, it should finally be pointed out that in order to provide a clearer understanding of the structure of the container, it and its component parts have been illustrated on a distorted scale and/or on an enlarged and/or reduced scale.

The independent solutions proposed by the invention as a means of achieving the objective can be found in the description.

Above all, the individual embodiments illustrated in FIGS. 1; 2; 3; 4, 5; 6, 7; 8, 9; 10, 11; 12, 13; 14, 15, 16, 17, 18; 19, 20; 21, 22; 23, 24; 25, 26 maybe regarded as independent solutions proposed by the invention. The tasks and solutions are to be found in the detailed descriptions accompanying these drawings.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A container, comprising:

a base and a plurality of flaps, each of the flaps being hingedly connected at a front edge thereof to the base by at least one hinge mechanism;

each hinge mechanism comprising at least one hinge pin affixed to the corresponding flap and a groove formed in the base for receiving the hinge pin, the hinge pin extending parallel to the front edge of the flap and being affixed to the front edge by a connecting link that extends therebetween such that the hinge pin is spaced at a distance from the front edge, wherein the groove is formed in a peripheral ridge that projects above a surface of the base, the groove extending along a longitudinal axis thereof and having an opening extending laterally thereinto through which the hinge pin can be inserted into the groove, said opening facing in a direction parallel to the base toward an interior of the container, the groove having an end region forming a housing chamber for an end region of the hinge pin, the end region of the hinge pin having a length projecting beyond the connecting link in the direction of the longitudinal axis of the groove, the housing chamber being defined by a retaining shoulder preventing the hinge pin from being laterally withdrawn from the groove, the peripheral ridge defining a recess therein so as to provide a region for the connecting link of the hinge pin to pivot about the longitudinal axis of the groove, the recess for the connecting link being delimited in the direction of the longitudinal axis by the retaining shoulder and a stop, a distance between the retaining shoulder and the stop being at least as great as a length of the connecting link in a direction parallel to the hinge pin but not greater than a sum of the length of the connecting link and the length of the end region of the hinge pin, and wherein each hinge mechanism is structured and arranged such that the hinge pin is insertable laterally into the groove when the respective flap is positioned approximately parallel with the base and such that the hinge pin is movable in the groove in the direction of the longitudinal axis thereof while the flap is so positioned.

2. Container comprising a plurality of flaps, several of said flaps being adjustably joined at front edges thereof by hinge mechanisms to a flap forming a base, and at least one hinge pin extending parallel with a front edge of a flap being retained at a distance apart therefrom by a connecting link and being insertable in a groove formed in a bearing housing of another flap, an end region of the groove having a retaining shoulder forming, across a width thereof, a housing chamber for an end region of the hinge pin, wherein between at least two hinge pins, arranged in the region of a front edge of a flap, a pivot stop is provided being operational at least when the flaps are in an upright position, which projects into an arc circumscribed by an advance angular distance in a pivoting direction required to place the flaps upright, which extends coaxially with an axis of the hinge pin and has a radius which corresponds to a measurement of the axis from the front edge of the other flap facing it, wherein the pivot stop has a substantially rectangular-shaped stand surface that faces a support surface of the base when the flap is upright, and wherein a side edge of the stand surface protrudes beyond and forms a tangent with an external contour surface of the hinge pin.

3. The container according to claim 1, further comprising a connecting mechanism arranged in an overlapping region between narrow front ends of two adjacent flaps so as to releasably connect the flaps when the flaps are placed in a position extending substantially perpendicular to the base which prevents the connecting mechanism from coming loose of its own accord, wherein the connecting mechanism is provided as a connecting element permanently arranged in a flap which projects in a direction towards the other flap and cooperates with a connecting seat having elastically deformable retaining elements provided in a congruent arrangement on the other flap.

4. A container, comprising a base and at least two flaps that form side walls which are adjustably joined to the base by hinge mechanisms and having supporting and centering elements arranged in an overlapping region between a front face of one side wall and an internal surface of the other side wall, provided in the form of projections and recesses, which, when the side walls are in the upright position, locate one with the other to produce a releasable positive connection and several projections and recesses lie adjacent to one another in a vertical row adjacent to the edges of the side wall, wherein the supporting and centering elements are arranged in the plane of a flap running in several different spatial directions relative to one another, wherein each of the flaps has a peripheral ridge and a reinforcing brace located inwardly therefrom in a direction toward a center of the flap, the supporting and centering elements extending from the peripheral ridge in a direction towards the reinforcing brace and across a thickness of the flap, wherein notches are provided in the peripheral ridge of one flap for receiving part regions of the supporting and centering elements of the other flap.

5. The container according to claim 1, wherein the retaining shoulder defines a cover element and a measurement between the front edge of the flaps facing the base and, facing it, an adjacently lying surface-part of the end region of the hinge pin is slightly larger than a thickness of the cover element.

6. The container according to claim 5, wherein a distance to an end region adjoining the cover element corresponds to a thickness of the cover element.

7. The container according to claim 6, wherein a pivot stop is provided on the front edge between two hinge pins on at least one flap, the pivot stop being operational at least when the flap is in an upright position, the pivot stop projecting into an arc circumscribed by an advance angular distance in a pivoting direction required to place the flap upright, the pivot stop having a stand surface that faces a support surface of the base when the flap is upright, and wherein the difference between the thickness and the measurement is the same as a distance between the stand surface of the pivot stop and the support surface.

8. The container according to claim 7, wherein a difference between the thickness and the measurement is smaller than the distance between the stand surface and the support surface.

9. The container according to claim 1, wherein the hinge pin has a connecting link as well as end regions projecting along the longitudinal central axis.

10. The container according to claim 1, wherein the end region of the hinge pin has a peripheral conical guide surface at the front face.

11. The container according to claim 1, wherein the groove has a groove floor of a concave design.

12. The container according to claim 1, wherein the groove has two end regions and one of the end regions is closed off across a diameter extending around the groove by means of the retaining shoulder and a cover element.

13. The container according to claim 12, wherein in conjunction with the cover element, the retaining shoulder forms a housing chamber for the end region of the hinge pin.

14. The container according to claim 1, wherein a diameter of the groove is the same size as or slightly larger than a diameter of the hinge pin.

15. The container according to claim 1, wherein the groove is arranged in part regions of the peripheral ridge.

16. The container according to claim 1, wherein an open length of the groove is at least the same as or slightly longer than the length of the hinge pin.

17. The container according to claim 1, wherein the distance between the retaining shoulder and the stop is greater than the length of the connecting link as measured in the longitudinal direction of the longitudinal central axis of the connecting link.

18. The container according to claim 1, wherein the recess comprises a radially circumferential recess arranged between a front face of the retaining shoulder facing the stop and the stop and wherein the recess has a curvature length.

19. The container according to claim 18, wherein the recess is designed so as to leave free a pivoting range for the connecting link matching the dimension of the curvature length.

20. The container according to claim 1, wherein an end region of the side wall facing the opening of the groove has an inclined surface extending in a direction towards the central longitudinal axis.

21. The container according to claim 1, wherein a width of the opening of the groove is the same size as the diameter of the hinge pin.

22. The container according to claim 21, wherein the opening width of the groove is slightly smaller than the diameter of the hinge pin.

23. The container according to claim 1, wherein the groove floor has a recess which matches an external contour of the hinge pin.

24. The container according to claim 2, wherein the stand surface of the pivot stop is arranged at a slight distance above the support surface of the base when the flaps are upright.

25. The container according to claim 24, wherein when the flaps are in a position perpendicular to the base, the front edges of the flaps are parallel with the support surface and spaced apart therefrom by a height of the flaps.

26. The container according to claim 1, wherein the hinge pins retained by the connecting links at a distance from the front edge are arranged in pairs.

27. The container according to claim 26, wherein the hinge-pin pairs include a pair of hinge pins lying adjacent to a longitudinal center of the flaps and additional hinge pin pairs adjacent opposite ends of the flaps, and wherein the hinge-pin pair adjacent the longitudinal center of the flaps have a smaller distance between the individual hinge pins than the hinge-pin pairs arranged in adjacent the ends.

28. The container according to claim 27, wherein a respective pivot stop is arranged between the individual hinge pins of each of the hinge-pin pairs.

29. The container according to claim 28, wherein a length of the pivot stops between the hinge-pin pairs in a direction towards the ends of the flaps is smaller than a distance between the hinge-pin pairs.

30. The container according to claim 2, wherein a length of the pivot stop in the direction of the hinge pin is smaller than a length of a recess provided in the bearing housing for receiving the pivot stop.

31. The container according to claim 30, wherein the difference between the length of the pivot stop and the length of the recess in the bearing housing corresponds to a length of the end region of the hinge pin projecting beyond the connecting link.

32. The container according to claim 2, wherein a height of the pivot stops is the same size as a width of the bearing housing.

33. The container according to claim 2, wherein the pivot stop has a stand surface that faces a support surface of the base when the flaps are upright, and wherein a distance between the longitudinal central axis of the hinge pin and the stand surface of the pivot stop is not greater than a distance between the longitudinal central axis of the groove and an internal side wall of the bearing housing facing the flap.

34. The container according to claim 3, wherein the connecting element is designed as a mushroom-head projection.

35. The container according to claim 34, wherein the elastically deformable retaining elements have projections which locate behind the mushroom-headed projections.

36. The container according to claim 3, wherein the connecting seats are of a circular or square or polygonal design.

37. The container according to claim 3, wherein the connecting seats are oblong slots.

38. The container according to claim 3, wherein the connecting seats are arranged at an angle in a peripheral region of the flaps.

39. The container according to claim 3, wherein a width of the front end of the projection is smaller than an opening width of the retaining elements facing the front end of the projection.

40. The container according to claim 3, wherein recesses are arranged along the retaining elements in order to impart a resilient design thereto.

41. The container according to claim 4, wherein the supporting and centering elements are of an S-shaped or L-shaped design.

42. The container according to claim 4, wherein at least one of the flaps has stop ridges at opposite ends thereof projecting beyond a surface of the flap that faces an opposite one of the flaps, and wherein a depth of the notches corresponds to a height of the part regions of the supporting and centering elements measured perpendicular to the stop ridge.

43. The container according to claim 42, wherein external faces of the supporting and centering elements abut with external faces of the supporting and centering elements of the stop ridge in a positive fit.

44. The container according to claim 4, wherein a height of the supporting and centering elements on one flap is the same as a height of the supporting and centering elements on another flap that adjoins therewith.

45. The container according to claim 44, wherein external faces of the supporting and centering elements of the respective adjoining flaps have inclined surfaces matching one another.

46. The container according to claim 42, wherein the supporting and centering elements of one flap taper in a direction toward the stop ridge of an adjoining flap.

47. The container according to claim 46, wherein the supporting and centering elements of the flap having the stop ridge taper in a direction towards the adjoining flap.

48. The container according to claim 4, wherein the flaps include side end walls and wherein the hinge mechanisms include bearing housings formed on the base for receiving the hinge pin of the flaps forming the longitudinal side walls, and wherein a length of the flaps forming the side end walls is the same as or slightly smaller than an internal width between opposing side surfaces of the bearing housings.

49. The container according to claim 48, wherein the flaps forming the longitudinal side walls have stop ridges formed on their opposite ends, and wherein an internal width between the stop ridges of each of the flaps forming the longitudinal side walls is the same as or slightly larger than a maximum distance between front end faces of the bearing housing facing away from one another.

50. The container according to claim 4, wherein the flaps include flaps forming side walls which have bar-like longitudinal stays, vertical stays and diagonal supporting elements.

51. The container according to claim 4, wherein centering recesses are arranged in a longitudinal side edge of the side walls for receiving matching centering projections in the base of another one of the containers when multiple containers are stacked.

52. The container according to claim 1, wherein an axis of the hinge pin is arranged at a distance from an internal surface of the flap to which the hinge pin is attached, in a direction normal to said internal surface, said distance being greater than half the thickness of said flap.

53. The container according to claim 4, wherein at least one of the flaps includes a reinforcing brace formed as a hollow section.

54. The container according to claim 4, wherein a total thickness of the base of the peripheral ridge with the bearing housings in the front end region of the flap corresponds to a sum of the thickness of the flap plus a thickness of the hinge pin and a thickness of the cover element.

55. The container according to claim 4, wherein a total thickness of the peripheral ridges with the bearing housings for the flaps is greater than a total a thickness of the peripheral ridges with the bearing housings in the region of the flaps by a thickness of the flaps.

56. The container according to claim 4, wherein the base has rims projecting above an underside thereof.

57. The container according to claim 56, wherein the flaps include a pair of flaps forming end walls of the container, and wherein a dimension of the rims in a side view of the base and a dimension of the rims in a front view of the base substantially correspond respectively to an internal width between the longitudinal side walls in their upright position and an internal width between the end walls in their upright position.

58. The container according to claim 4, wherein the flaps include a pair of flaps forming end walls of the container, wherein each of the flaps forming the end walls and the longitudinal side walls has a peripheral ridge, and the flaps forming the longitudinal side walls have stop ridges formed at their opposite ends, and wherein the peripheral ridge for the flaps forming the longitudinal side walls projects outward beyond front edges of the peripheral ridges for the flaps forming the end walls by a dimension.

59. The container according to claim 58, wherein said dimension corresponds approximately to a thickness of the stop ridges of the flaps forming the longitudinal side walls.

60. The container according to claim 58, wherein a height of the flaps forming the side walls is greater than the half width of the base.

61. The container according to claim 58, wherein the flaps forming the side walls overlap with one another when pivoted to a transport position overlying the base and a thickness of the overlapping flaps is not greater than the thickness of one of the individual flaps.

62. The container according to claim 53, wherein an external side face of the reinforcing brace engages in a groove extending opposite in a reinforcing brace of an oppositely lying flap.

63. The container according to claim 1, wherein the flaps are arranged to be pivoted into a transport position overlying the base, and wherein the flaps when in the transport position form an overlapping region.

64. The container according to claim 63, wherein reinforcing ribs are arranged in the overlapping region of the flaps.

* * * * *

UNITED STATES PATENT AND TRADEMARK OFFICE
CERTIFICATE OF CORRECTION

PATENT NO. : 6,708,836 B2
DATED : March 23, 2004
INVENTOR(S) : Zelko

Page 1 of 1

It is certified that error appears in the above-identified patent and that said Letters Patent is hereby corrected as shown below:

<u>Title page,</u>
Item [22], PCT Filed, should read -- May 18, 2001 --.
Insert the following:
-- [30] Foreign Application Priority Data
Nov. 18, 1998 (AT)    A1925/98 --.

Signed and Sealed this

Fifteenth Day of June, 2004

JON W. DUDAS
*Acting Director of the United States Patent and Trademark Office*